United States Patent [19]
Porter et al.

[11] Patent Number: 5,864,682
[45] Date of Patent: *Jan. 26, 1999

[54] METHOD AND APPARATUS FOR FRAME ACCURATE ACCESS OF DIGITAL AUDIO-VISUAL INFORMATION

[75] Inventors: Mark A. Porter, Woodside; Dave Pawson, Palo Alto, both of Calif.

[73] Assignee: Oracle Corporation, Redwood Shores, Calif.

[ * ] Notice: The term of this patent shall not extend beyond the expiration date of Pat. No. 5,659,539.

[21] Appl. No.: 859,860

[22] Filed: May 21, 1997

Related U.S. Application Data

[63] Continuation of Ser. No. 502,480, Jul. 14, 1995, Pat. No. 5,659,539.

[51] Int. Cl.⁶ .................................................. H04L 5/00
[52] U.S. Cl. ................... 395/200.77; 395/200.61; 395/200.66; 348/12; 348/13; 455/5.1; 370/468
[58] Field of Search ........................ 395/200.61, 200.66, 395/200.77; 348/7, 12, 13, 17, 19; 370/468, 84, 108; 455/5.1

[56] References Cited

U.S. PATENT DOCUMENTS

| | | | |
|---|---|---|---|
| 5,481,542 | 1/1996 | Logston et al. | 370/94.2 |
| 5,502,494 | 3/1996 | Auld | 348/426 |
| 5,513,011 | 4/1996 | Matsumoto et al. | 358/341 |
| 5,521,630 | 5/1996 | Chen et al. | 348/7 |
| 5,521,841 | 5/1996 | Arman et al. | 364/514 A |
| 5,528,282 | 6/1996 | Voeten et al. | 348/7 |
| 5,543,861 | 8/1996 | Harradine et al. | 348/718 |
| 5,553,005 | 9/1996 | Voeten et al. | 364/514 R |
| 5,559,999 | 9/1996 | Maturi et al. | 395/550 |
| 5,566,174 | 10/1996 | Sato et al. | 370/84 |
| 5,659,539 | 8/1997 | Porter et al. | 395/200.61 |

FOREIGN PATENT DOCUMENTS

| | | |
|---|---|---|
| 0396062 | 11/1990 | European Pat. Off. . |
| 0545323A1 | 6/1993 | European Pat. Off. . |
| 0605115A2 | 7/1994 | European Pat. Off. . |
| 0633694A1 | 1/1995 | European Pat. Off. . |
| 0653884A1 | 5/1995 | European Pat. Off. . |

*Primary Examiner*—James P. Trammell
*Assistant Examiner*—Patrick Assouad
*Attorney, Agent, or Firm*—McDermott, Will & Emery

[57] ABSTRACT

A method and apparatus for use in a digital video delivery system is provided. A digital representation of an audio-visual work, such as an MPEG file, is parsed to produce a tag file. The tag file includes information about each of the frames in the audio-visual work. During the performance of the audio-visual work, data from the digital representation is sent from a video pump to a decoder. Seek operations are performed by causing the video pump to stop transmitting data from the current position in the digital representation, and to start transmitting data from a new position in the digital representation. The information in the tag file is inspected to determine the new position from which to start transmitting data. To ensure that the data stream transmitted by the video pump maintains compliance with the applicable video format, prefix data that includes appropriate header information is transmitted by said video pump prior to transmitting data from the new position. Fast and slow forward and rewind operations are performed by selecting video frames based on the information contained in the tag file and the desired presentation rate, and generating a data stream containing data that represents the selected video frames. A video editor is provided for generating a new video file from pre-existing video files. The video editor selects frames from the pre-existing video files based on editing commands and the information contained in the tag files of the pre-existing video files. A presentation rate, start position, end position, and source file may be separately specified for each sequence to be created by the video editor.

25 Claims, 12 Drawing Sheets

METHOD AND APPARATUS FOR FRAME ACCURATE ACCESS OF DIGITAL AUDIO-VISUAL INFORMATION

This application is a continuation of application Ser. No. 08/502,480 filed Jul. 14, 1995 U.S. Pat. No. 5,659,539.

FIELD OF THE INVENTION

The present invention relates to a method and apparatus for processing audio-visual information, and more specifically, to a method and apparatus for providing non-sequential access to audio-visual information stored in a digital format.

BACKGROUND OF THE INVENTION

In recent years, the media industry has expanded its horizons beyond traditional analog technologies. Audio, photographs, and even feature films are now being recorded or converted into digital formats. To encourage compatibility between products, standard formats have been developed in many of the media categories.

MPEG is a popular standard that has been developed for digitally storing audio-visual sequences and for supplying the digital data that represents the audio-visual sequences to a client. For the purposes of explanation, the MPEG-1 and MPEG-2 formats shall be used to explain problems associated with providing non-sequential access to audio-visual information. The techniques employed by the present invention to overcome these problems shall also be described in the context of MPEG. However, it should be understood that MPEG-1 and MPEG-2 are merely two contexts in which the invention may be applied. The invention is not limited to any particular digital format.

In the MPEG format, video and audio information are stored in a binary file (an "MPEG file"). The video information within the MPEG file represents a sequence of video frames. This video information may be intermixed with audio information that represents one or more soundtracks. The amount of information used to represent a frame of video within the MPEG file varies greatly from frame to frame based both on the visual content of the frame and the technique used to digitally represent that content. In a typical MPEG file, the amount of digital data used to encode a single video frame varies from 2K bytes to 50K bytes.

During playback, the audio-visual information represented in the MPEG file is sent to a client in a data stream (an "MPEG data stream"). An MPEG data stream must comply with certain criteria set forth in the MPEG standards. In MPEG-2. the MPEG data stream must consist of fixed-size packets. Specifically, each packet must be exactly 188 bytes. In MPEG-1. the size of each packet may vary, with a typical size being 2252 bytes. Each packet includes a header that contains data to describe the contents of the packet. Because the amount of data used to represent each frame varies and the size of packets does not vary, there is no correlation between the packet boundaries and the boundaries of the video frame information contained therein.

MPEG employs three general techniques for encoding frames of video. The three techniques produce three types of frame data: Inter-frame ("I-frame") data, Predicted frame ("P-frame") data and Bi-directional ("B-frame") data. I-frame data contains all of the information required to completely recreate a frame. P-frame data contains information that represents the difference between a fame and the frame that corresponds to the previous I-frame data or P-frame data. B-frame data contains information that represents relative movement between preceding I or P-frame data and succeeding I or P-frame data. These digital frame formats are described in detail in the following international standards: ISO/IEC 13818-1, 2, 3 (MPEG-2) and ISO/IEC 11172-1, 2, 3 (MPEG-1). Documents that describe these standards (hereafter referred to as the "MPEG specifications") are available from ISO/IEC Copyright Office Case Postale 56. CH 1211. Genéve 20. Switzerland.

As explained above, video frames cannot be created from P and B-frame data alone. To recreate video frames represented in P-frame data, the preceding I or P-frame data is required. Thus, a P-frame can be said to "depend on" the preceding I or P-frame. To recreate video frames represented in B-frame data, the preceding I or P-frame data and the succeeding I or P-frame data are required. Thus, B-frames can be said to depend on the preceding and succeeding I or P-frames.

The dependencies described above are illustrated in FIG. 1a. The arrows in FIG. 1a indicate an "depends on" relationship. Specifically, if a given frame depends on another frame, then an arrow points from the given frame to the other frame.

In the illustrated example, frame 20 represents an I-frame. I-frames do not depend on any other frames, therefore no arrows point from frame 20. Frames 26 and 34 represent P-frames. A P-frame depends on the preceding I or P frame. Consequently, an arrow 36 points from P-frame 26 to I-frame 20, and an arrow 38 points from P-frame 34 to P-frame 26.

Frames 22, 24, 28, 30 and 32 represent B-frames. B-frames depend on the preceding and succeeding I or P-frames. Consequently arrows 40 point from each of frames 22, 24, 28, 30 and 32 to the I or P-frame that precedes each of the B-frames, and to each I or P-frame that follows each of the B-frames.

The characteristics of the MPEG format described above allow a large amount of audio-visual information to be stored in a relatively small amount of digital storage space. However, these same characteristics make it difficult to play the audio-visual content of an MPEG file in anything but a strict sequential manner. For example, it would be extremely difficult to randomly access a video frame because the data for the video frame may start in the middle of one MPEG packet and end in the middle of another MPEG packet. Further, if the frame is represented by P-frame data, the frame cannot be recreated without processing the I and P-frames immediately preceding the P-frame data. If the frame is represented by B-frame data, the frame cannot be recreated without processing the I and P-frames immediately preceding the B-frame data, and the P-frame or I-frame immediately following the B-frame data.

As would be expected, the viewers of digital video desire the same functionality from the providers of digital video as they now enjoy while watching analog video tapes on video cassette recorders. For example, viewers want to be able to make the video jump ahead, jump back, fast forward, fast rewind, slow forward, slow rewind and freeze frame. However, due to the characteristics of the MPEG video format, MPEG video providers have only been able to offer partial implementations of some of these features.

Some MPEG providers have implemented fast forward functionality by generating fast forward MPEG files. A fast forward MPEG file is made by recording in MPEG format the fast-forward performance of an analog version of an audio-visual sequence. Once a fast forward MPEG file has been created, an MPEG server can simulate fast forward during playback by transmitting an MPEG data stream to a user from data in both the normal-speed MPEG file and the fast forward MPEG file. Specifically, the MPEG server switches between reading from the normal MPEG file and reading from the fast forward MPEG file in response to fast forward and normal play commands generated by the user. This same technique can be used to implement fast rewind, forward slow motion and backward slow motion.

The separate-MPEG file implementation of fast forward described above has numerous disadvantages. Specifically, the separate-MPEG file implementation requires the performance of a separate analog-to-MPEG conversion for each playback rate that will be supported. This drawback is significant because the analog-to-MPEG conversion process is complex and expensive. A second disadvantage is that the use of multiple MPEG files can more than double the digital storage space required for a particular audio-visual sequence. A 2× fast forward MPEG file will be approximately half the size of the normal speed MPEG file. A half-speed slow motion MPEG file will be approximately twice the size of the normal speed MPEG file. Since a typical movie takes 2 to 4 gigabytes of disk storage, these costs are significant.

A third disadvantage with the separate-MPEG file approach is that only the playback rates that are specifically encoded will be available to the user. The technique does not support rates that are faster than, slower than, or between the specifically encoded rates. A fourth disadvantage is that the separate-MPEG file approach requires the existence of a complete analog version of the target audio-visual sequence. Consequently, the technique cannot be applied to live feeds, such as live sports events fed through an MPEG encoder and out to users in real-time.

Based on the foregoing, it is clearly desirable to provide a method and apparatus for sequentially displaying non-sequential frames of a digital video. It is further desirable to provide such non-sequential access in a way that does not require the creation and use of multiple digital video files. It is further desirable to provide such access for real-time feeds as well as stored audio-visual content.

SUMMARY OF THE INVENTION

A method and apparatus for use in a digital video delivery system is provided. A digital representation of an audio-visual work, such as an MPEG file, is parsed to produce a tag file. The tag file includes information about each of the frames in the audio-visual work. Specifically, the tag file contains state information about the state of one or more state machines that are used to decode the digital representation. The state information will vary depending on the specific technique used to encode the audio-visual work. For MPEG-2 files, for example, the tag file includes information about the state of the program elementary stream state machine, the video state machine, and the transport layer state machine.

During the performance of the audio-visual work, data from the digital representation is sent from a video pump to a decoder. According to one embodiment of the invention, the information in the tag file is used to perform seek, fast forward, fast rewind, slow forward and slow rewind operations during the performance of the audio-visual work.

Seek operations are performed by causing the video pump to stop transmitting data from the current position in the digital representation, and to start transmitting data from a new position in the digital representation. The information in the tag file is inspected to determine the new position from which to start transmitting data. To ensure that the data stream transmitted by the video pump maintains compliance with the applicable video format, prefix data that includes appropriate header information is transmitted by said video pump prior to transmitting data from the new position.

Fast forward, fast rewind, slow forward and slow rewind operations are performed by selecting video frames based on the information contained in the tag file and the desired presentation rate, and generating a data stream containing data that represents the selected video frames. The selection process takes into account a variety of factors, including the data transfer rate of the channel on which the data is to be sent, the frame type of the frames, a minimum padding rate, and the possibility of a buffer overflow on the decoder. Prefix and suffix data are inserted into the transmitted data stream before and after the data for each frame in order to maintain compliance with the data stream format expected by the decoder.

A video editor is provided for generating a new video file from pre-existing video files. The video editor selects frames from the pre-existing video files based on editing commands and the information contained in the tag files of the pre-existing video files. A presentation rate, start position, end position, and source file may be separately specified for each sequence to be created by the video editor. The video editor adds prefix and suffix data between video data to ensure that the new video file conforms to the desired format. Significantly, the new video files created by this method are created without the need to perform additional analog-to-digital encoding. Further, since analog-to-digital encoding is not performed, the new file can be created even when one does not have access to the original analog recordings of the audio-visual works.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3b illustrates the data generated by the video pump to a client in response to the commands illustrated in FIG. 3a;

FIG. 4b illustrates the data generated by the video pump to a client in response to the commands illustrated in FIG. 4a;

DETAILED DESCRIPTION OF THE PREFERRED EMBODIMENT

In the following description, the various features of the invention shall discussed under topic headings that appear in the following order:

I. OVERVIEW
II. TAG FILE GENERATION
III. DIGITAL AUDIO/VIDEO FILE STRUCTURE
IV. TAG FILE CONTENTS
V. SEEK OPERATIONS
VI. PREFIX DATA
VII. PACKET DISCONTINUITIES
VIII. BUFFER LIMITATIONS
IX. SPECIFIED-RATE PLAYBACK OPERATIONS
X. BIT BUDGETING
XI. FRAME TYPE CONSTRAINTS
XII. SUFFIX DATA
XIII. SLOW MOTION OPERATIONS
XIV. REWIND OPERATIONS
XV. RUNTIME COMMUNICATION
XVI. FRAME ACCURATE POSITIONING
XVII. DISK ACCESS CONSTRAINTS
XVIII. VARIABLE RATE PLAYBACK OPERATIONS
XIX. NON-INTERACTIVE DIGITAL AUDIO-VIDEO EDITING
XX. DISTRIBUTED SYSTEM

I. OVERVIEW

Figure 1A:
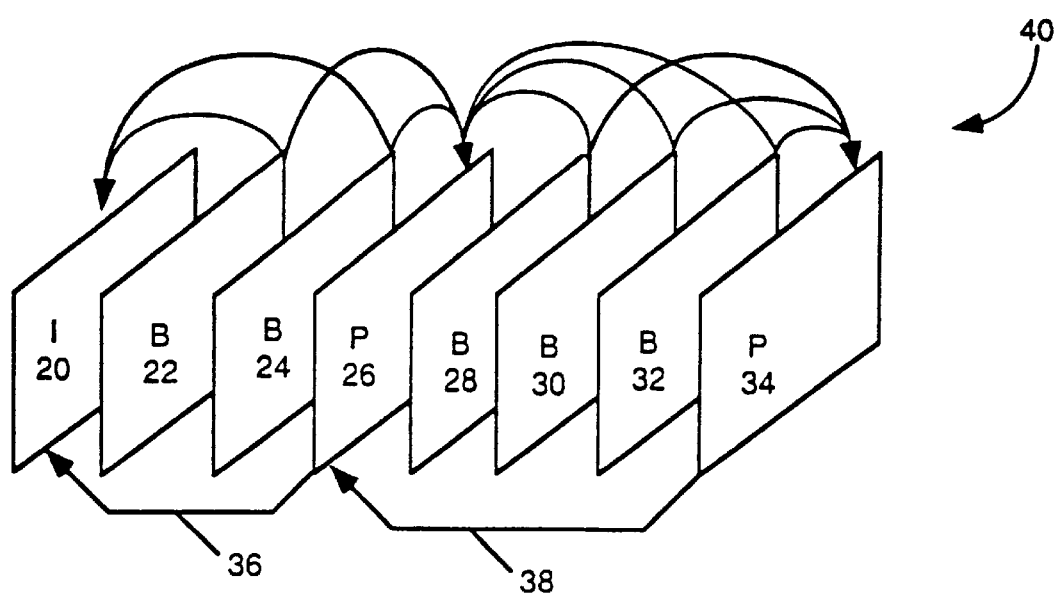
FIG. 1a is a diagram illustrating the dependencies between different types of frames in an MPEG data stream.
Figure 1B:
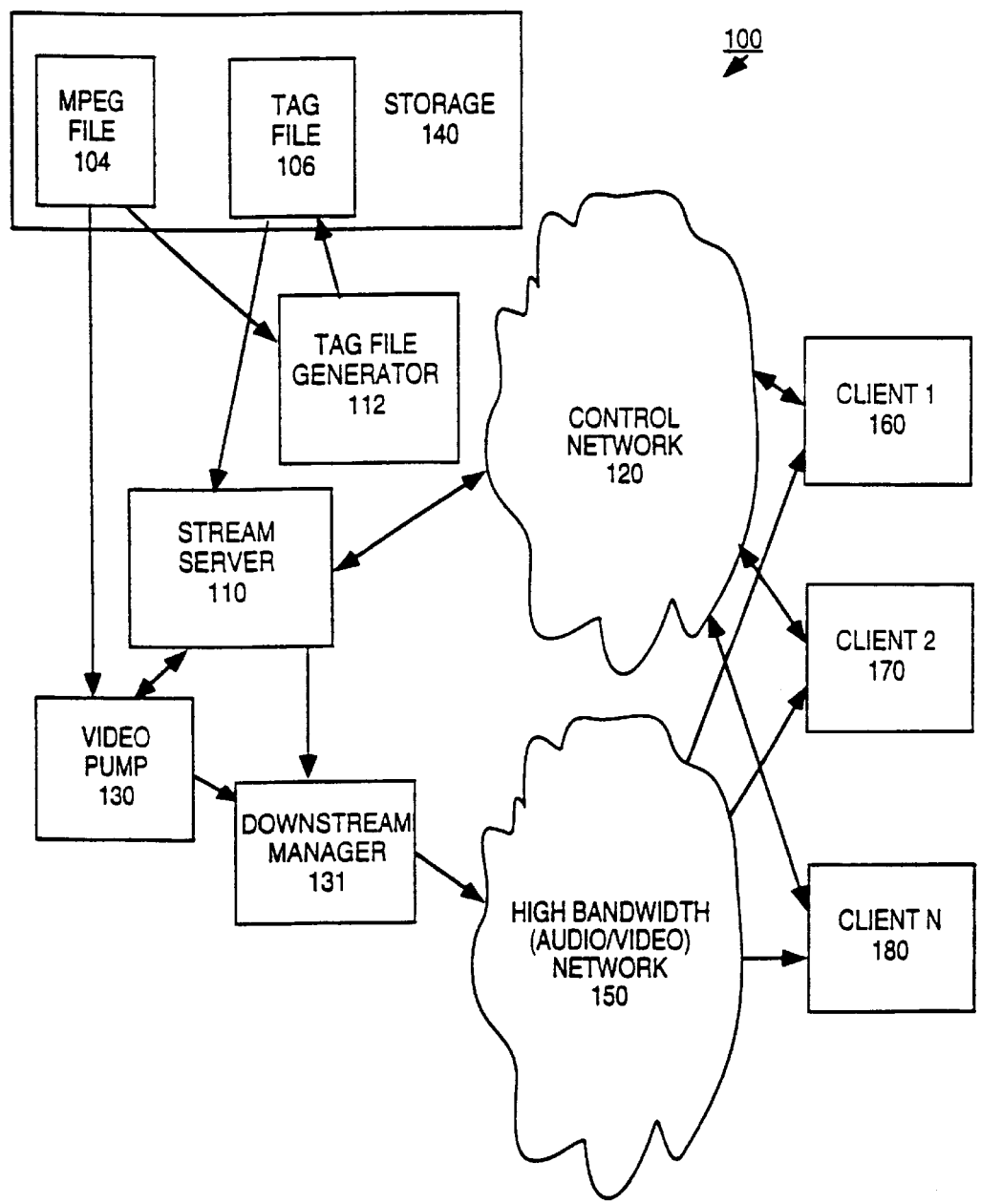
FIG. 1b is a block diagram of an audio-visual information delivery system according to an embodiment of the present invention.

FIG. 1b is a block diagram illustrating an audio-visual information delivery system 100 according to one embodiment of the present invention. Audio-visual information delivery system 100 contains a plurality of clients (1-n) 160, 170 and 180. The clients (1-n) 160, 170 and 180 generally represent devices configured to decode audio-visual information contained in a stream of digital audio-visual data. For example, the clients (1-n) 160, 170, and 180 may be set top converter boxes coupled to an output display, such as television.

As shown in FIG. 1b. the audio-visual information delivery system 100 also includes a stream server 110 coupled to a control network 120. Control network 120 may be any network that allows communication between two or more devices. For example, control network 120 may be a high bandwidth network, an X.25 circuit or an electronic industry association (EIA) 232 (RS-232) serial line.

The clients (1-n) 160, 170 and 180, also coupled to the control network 120, communicate with the stream server 110 via the control network 120. For example, clients 160, 170 and 180 may transmit requests to initiate the transmission of audio-visual data streams, transmit control information to affect the playback of ongoing digital audio-visual transmissions, or transmit queries for information. Such queries may include, for example, requests for information about which audio-visual data streams are currently available for service.

The audio-visual information delivery system 100 further includes a video pump 130, a mass storage device 140, and a high bandwidth network 150. The video pump 130 is coupled to the stream server 110 and receives commands from the stream server 110. The video pump 130 is coupled to the mass storage device 140 such that the video pump 130 stores and retrieves data from the mass storage device 140. The mass storage device 140 may be any type of device or devices used to store large amounts of data. For example, the mass storage device 140 may be a magnetic storage device or an optical storage device. The mass storage device 140 is intended to represent a broad category of non-volatile storage devices used to store digital data, which are well known in the art and will not be described further. While networks 120 and 150 are illustrated as different networks for the purpose of explanation, networks 120 and 150 may be implemented on a single network.

In addition to communicating with the stream server 110, the clients (1-n) 160, 170 and 180 receive information from the video pump 130 through the high bandwidth network 150. The high bandwidth network 150 may be any of type of circuit-style network link capable of transferring large amounts of data. A circuit-style network link is configured such that the destination of the data is guaranteed by the underlying network, not by the transmission protocol. For example, the high bandwidth network 150 may be an asynchronous transfer mode (ATM circuit or a physical type of line, such as a T1 or E1 line. In addition, the high bandwidth network 150 may utilize a fiber optic cable, twisted pair conductors, coaxial cable, or a wireless communication system, such as a microwave communication system.

The audio-visual information delivery system 100 of the present invention permits a server, such as the video pump 130, to transfer large amounts of data from the mass storage device 140 over the high bandwidth network 150 to the clients (1-n) 160, 170 and 180 with minimal overhead. In addition, the audio-visual information delivery system 100 permits the clients (1-n) 160, 170, and 180 to transmit requests to the stream server 110 using a standard network protocol via the control network 120. In a preferred embodiment, the underlying protocol for the high bandwidth network 150 and the control network 120 is the same. The stream server 110 may consist of a single computer system, or may consist of a plurality of computing devices configured as servers. Similarly, the video pump 130 may consist of a single server device, or may include a plurality of such servers.

To receive a digital audio-visual data stream from a particular digital audio-visual file, a client (1-n) 160, 170 or 180 transmits a request to the stream server 110. In response to the request, the stream server 110 transmits commands to the video pump 130 to cause video pump 130 to transmit the requested digital audio-visual data stream to the client that requested the digital audio-visual data stream.

The commands sent to the video pump 130 from the stream server 110 include control information specific to the client request. For example, the control information identifies the desired digital audio-visual file, the beginning offset of the desired data within the digital audio-visual file, and the address of the client. In order to create a valid digital audio-visual stream at the specified offset, the stream server 110 also sends "prefix data" to the video pump 130 and requests the video pump 130 to send the prefix data to the client. As shall be described in greater detail hereafter, prefix data is data that prepares the client to receive digital audio-visual data from the specified location in the digital audio-visual file.

The video pump 130, after receiving the commands and control information from the stream server 110, begins to retrieve digital audio-visual data from the specified location in the specified digital audio-visual file on the mass storage device 140. For the purpose of explanation, it shall be assumed that system 100 delivers audio-visual information in accordance with one or more of the MPEG formats. Consequently, video pump 130 will retrieve the audio-visual data from an MPEG file 104 on the mass storage device 140.

The video pump 130 transmits the prefix data to the client, and then seamlessly transmits MPEG data retrieved from the mass storage device 140 beginning at the specified location to the client. The prefix data includes a packet header which, when followed by the MPEG data located at the specified position, creates an MPEG compliant transition packet. The data that follows the first packet is retrieved sequentially from the MPEG file 104, and will therefore constitute a series of MPEG compliant packets. The video pump 130 transmits these packets to the requesting client via the high bandwidth network 150.

The requesting client receives the MPEG data stream, beginning with the prefix data. The client decodes the MPEG data stream to reproduce the audio-visual sequence represented in the MPEG data stream.

II. TAG FILE GENERATION

System 100 includes a tag file generator 112. The tag file generator 112 generates a tag file 106 from the MPEG file 104. For stored MPEG content, the tag file generation operation is performed by tag file generator 112 "off-line" (i.e. prior to any client request for MPEG data from the MPEG file 104). However, in certain situations, such a real-time MPEG feeds, tag file generation is performed in real-time during receipt of the MPEG data stream. Consequently, in the preferred embodiment, tag file generator 112 generates tag file 106 in real-time or faster. Tag file generation rates may be increased by parallelization of the tag file operation.

Tag file generator 112, stream server 110 and video pump 130 are illustrated as separate functional units for the purpose of explanation. However, the particular division of functionality between units may vary from implementation to implementation. The present invention is not limited to any particular division of functionality. For example, tag file generator 112 is illustrated as a stand-alone unit. However, in one embodiment, tag file generator 112 may be incorporated into an MPEG encoder. Such an MPEG encoder would generate the information contained in tag file 106 simultaneous with the generation of the information contained in MPEG file 104. An implementation that combines the MPEG encoding process with the tag file generation process may increase efficiency by eliminating the need to perform redundant operations. Such efficiency gains are particularly useful when processing audio-visual feeds in real-time.

The tag file 106 contains control information that is used by stream server 110 to implement fast forward, fast rewind, slow forward, slow rewind and seek operations. The use of the tag file 106 to perform these operations shall be described in greater detail below. The tag file 106 contains general information about the MPEG file 104 and specific information about each of the video frames in the MPEG file 104. Prior to discussing in detail the contents of the tag file 106, the general structure of MPEG file 104 shall be described with reference to FIG. 2a.

III. MPEG FILE STRUCTURE

Digital audio-visual storage formats, whether compressed or not, use state machines and packets of various structures. The techniques described herein apply to all such storage formats. While the present invention is not limited to any particular digital audio-visual format, the MPEG-2 transport file structure shall be described for the purposes of illustration.

Figure 2A:
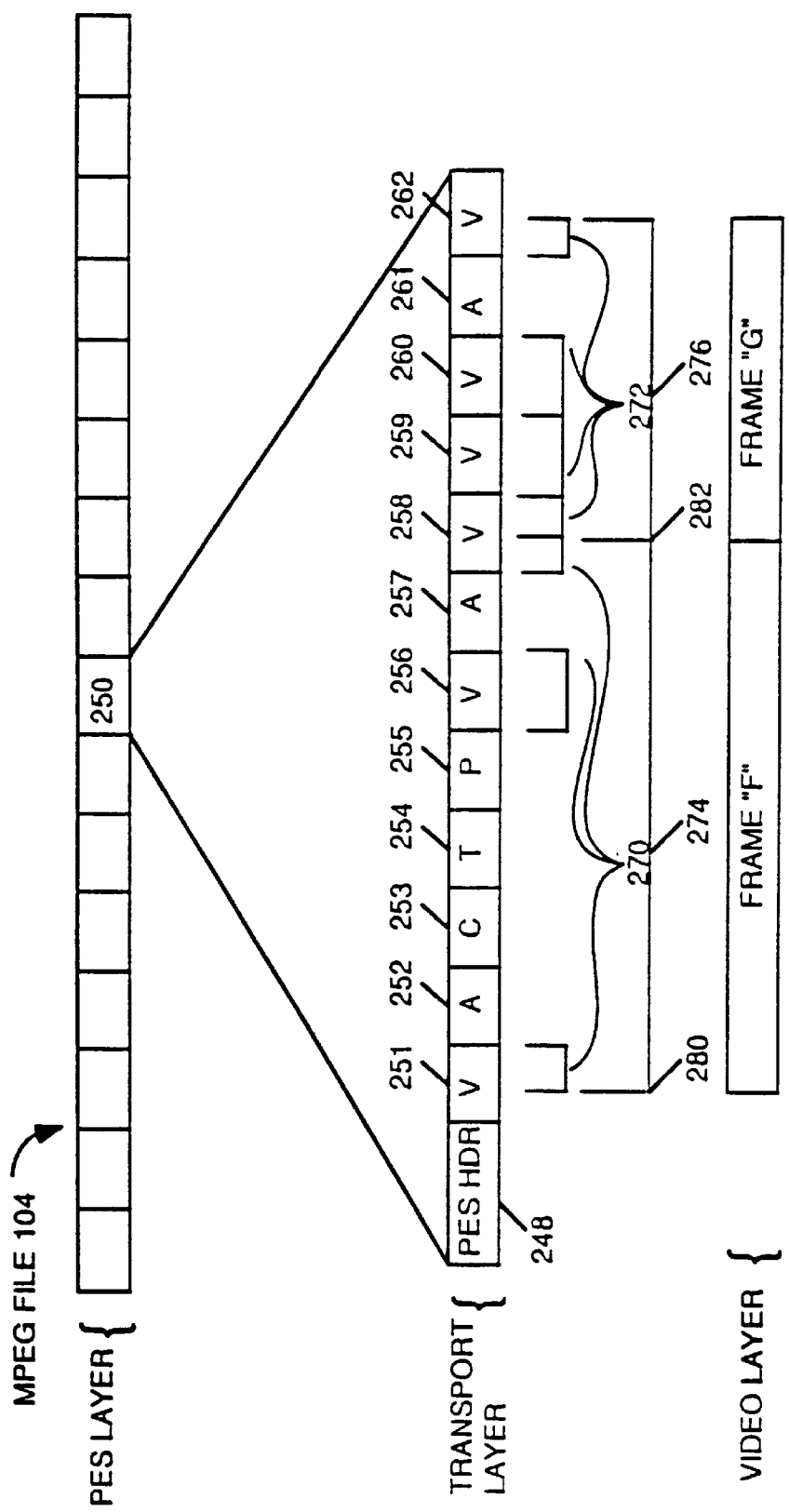
FIG. 2a illustrates the various layers in an MPEG file.

Referring to FIG. 2a. it illustrates the structure of an MPEG-2 transport file 104 in greater detail. The data within MPEG file 104 is packaged into three layers: a program elementary stream ("PES") layer, a transport layer, and a video layer. These layers are described in detail in the MPEG-2 specifications. At the PES layer, MPEG file 104 consists of a sequence of PES packets. At the transport layer, the MPEG file 104 consists of a sequence of transport packets. At the video layer, MPEG file 104 consists of a sequence of picture packets. Each picture packet contains the data for one frame of video.

Each PES packet has a header that identifies the length and contents of the PES packet. In the illustrated example, a PES packet 250 contains a header 248 followed by a sequence of transport packets 251–262. PES packet boundaries coincide with valid transport packet boundaries. Each transport packet contains exclusively one type of data. In the illustrated example, transport packets 251, 256, 258, 259, 260 and 262 contain video data. Transport packets 252, 257 and 261 contain audio data. Transport packet 253 contains control data. Transport packet 254 contains timing data. Transport packet 255 is a padding packet.

Each transport packet has a header. The header includes a program ID ("PID") for the packet. Packets assigned PID 0 are control packets. For example, packet 253 may be assigned PID 0. Other packets, including other control packets, are referenced in the PID 0 packets. Specifically, PID 0 control packets include tables that indicate the packet types of the packets that immediately follow the PID 0 control packets. For all packets which are not PID 0 control packets, the headers contain PIDs which serve as a pointers into the table contained in the PID 0 control packet that most immediately preceded the packets. For example, the type of data contained in a packet with a PID 100 would be determined by inspecting the entry associated with PID 100 in the table of the PID 0 control packet that most recently preceded the packet.

In the video layer, the MPEG file 104 is divided according to the boundaries of frame data. As mentioned above, there in no correlation between the boundaries of the data that represent video frames and the transport packet boundaries. In the illustrated example, the frame data for one video frame "F" is located as indicated by brackets 270. Specifically, the frame data for frame "F" is located from a point 280 within video packet 251 to the end of video packet 251, in video packet 256, and from the beginning of video packet 258 to a point 282 within video packet 258. Therefore, points 280 and 282 represent the boundaries for the picture packet for frame "F". The frame data for a second video frame "G" is located as indicated by brackets 272. The boundaries for the picture packet for frame "G" are indicated by bracket 276.

Structures analogous to those described above for MPEG-2 transport streams also exist in other digital audio-visual storage formats, including MPEG-1. Quicktime, AVI, Indeo, Cinepak, Proshare, H.261 and fractal formats. In the preferred embodiment, indicators of video access points, time stamps, file locations, etc. are stored such that multiple digital audio-visual storage formats can be accessed by the same server to simultaneously serve different clients from a wide variety of storage formats. Preferably, all of the format specific information and techniques are incorporated in the tag generator and the stream server. All of the other elements of the server are format independent.

IV. TAG FILE CONTENTS

Figure 2B:
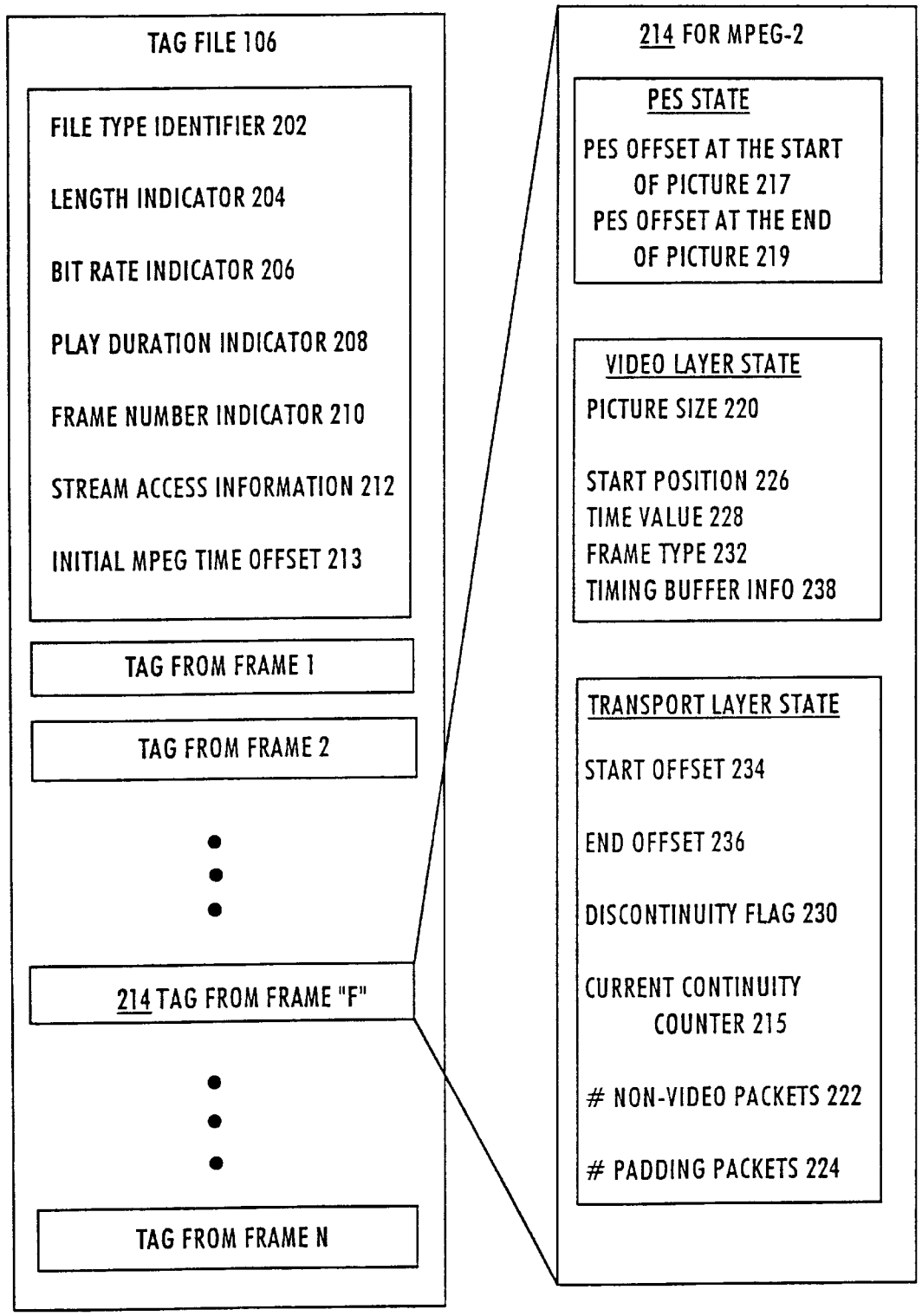
FIG. 2b illustrates the contents of a tag file generated according to an embodiment of the invention.

The contents of an exemplary tag file 106 shall now be described with reference to FIG. 2*b*. In FIG. 2*b*. the tag file 106 includes a file type identifier 202, a length indicator 204, a bit rate indicator 206, a play duration indicator 208, a frame number indicator 210, stream access information 212 and an initial MPEG time offset 213. File type identifier 202 indicates the physical wrapping on the MPEG file 104. For example, file type identifier 202 would indicate whether MPEG file 104 is a MPEG-2 or an MPEG-1 file.

Length indicator 204 indicates the length of the MPEG file 104. Bit rate indicator 206 indicates the bit rate at which the contents of the MPEG file 104 should be sent to a client during playback. The play duration indicator 208 specifies, in milliseconds, the amount of time required to play back the entire contents of MPEG file 104 during a normal playback operation. Frame number indicator 210 indicates the total number of frames represented in MPEG file 104.

Stream access information 212 is information required to access the video and audio streams stored within MPEG file 104. Stream access information 212 includes video elementary stream ID and an audio elementary stream ID. For MPEG-2 files, stream access information 212 also includes a video PID and an audio PID. The tag file header may also contain other information that may be used to implement features other than those provided by the present invention.

In addition to the general information described above, the tag file 106 contains an entry for each frame within the MPEG file 104. The entry for a video frame includes information about the state of the various MPEG layers relative to the position of the data that represents the frame. For an MPEG-2 file, each entry includes the state of the MPEG-2 transport state machine, the state of the program elementary stream state machine and the state of the video state machine. For an MPEG-1 file, each entry includes the current state of the Pack system MPEG stream and the state of the video state machine.

Tag file entry 214 illustrates in greater detail the tag information that is stored for an individual MPEG-2 video frame "F". With respect to the state of the program elementary stream state machine, the tag entry 214 includes the information indicated in Table 1.

TABLE 1

| DATA | MEANING |
| --- | --- |
| PES OFFSET AT THE START OF PICTURE 217 | The offset, within the PES packet that contains the frame data for frame "F" of the first byte of the frame data for frame "F". |
| PES OFFSET AT THE END OF PICTURE 219 | The offset between the last byte in the frame data for frame "F" and the end of the PES packet in which the frame data for frame "F" resides. |

With respect to the state of the video state machine, tag entry 214 includes the information indicated in Table 2.

TABLE 2

| DATA | MEANING |
| --- | --- |
| PICTURE SIZE 220 | The size of the picture packet for frame "F". |

TABLE 2-continued

| DATA | MEANING |
| --- | --- |
| START POSITION 226 | The location within the MPEG file of the first byte of the data that corresponds to frame "F" |
| TIME VALUE 228 | The time, relative to the beginning of the movie, when frame "F" would be displayed during a normal playback of MPEG file 104. |
| FRAME TYPE 232 | The technique used to encode the frame (e.g. I-frame, P-frame or B-frame). |
| TIMING BUFFER INFORMATION 238 | Indicates how full the buffer of the decoder is (sent to the decoder to determine when information should be moved out of the buffer in order to receive newly arriving information). |

With respect to the state of the transport layer state machine, tag entry 214 includes the information indicated in Table 3.

TABLE 3

| DATA | MEANING |
| --- | --- |
| START OFFSET 234 | The distance between the of the first byte in the frame data and the start of the transport packet in which the first byte resides. |
| # OF NON-VIDEO PACKETS 222 | The number of non-video packets (i.e. audio packets, padding packets, control packets and timing packets) that are located within the picture packet for frame "F". |
| # OF PADDING PACKETS 224 | The number of padding packets that are located within the picture packet for frame "F". |
| END OFFSET 236 | The distance between the last byte in the frame data and the end of the packet in which the last byte resides. |
| CURRENT CONTINUITY COUNTER 215 | The Continuity value associated with frame "F". |
| DISCONTINUITY FLAG 230 | Indicates whether there is a discontinuity in time between frame "F" and the frame represented in the previous tag entry. |

Assume, for example, that entry 214 is for the frame "F" of FIG. 2*a*. The size 220 associated with frame "F" would be the bits encompassed by bracket 274. The number 222 of non-video packets would be five (packets 252, 253, 254, 255 and 257. The number 224 of padding packets would be one (packet 255). The start position 226 would be the distance between the beginning of MPEG file 104 and point 280. The start offset 234 would be the distance between the start of packet 251 and point 280. The end offset 236 would be the distance between point 282 and the end of packet 258.

Figure 2C:
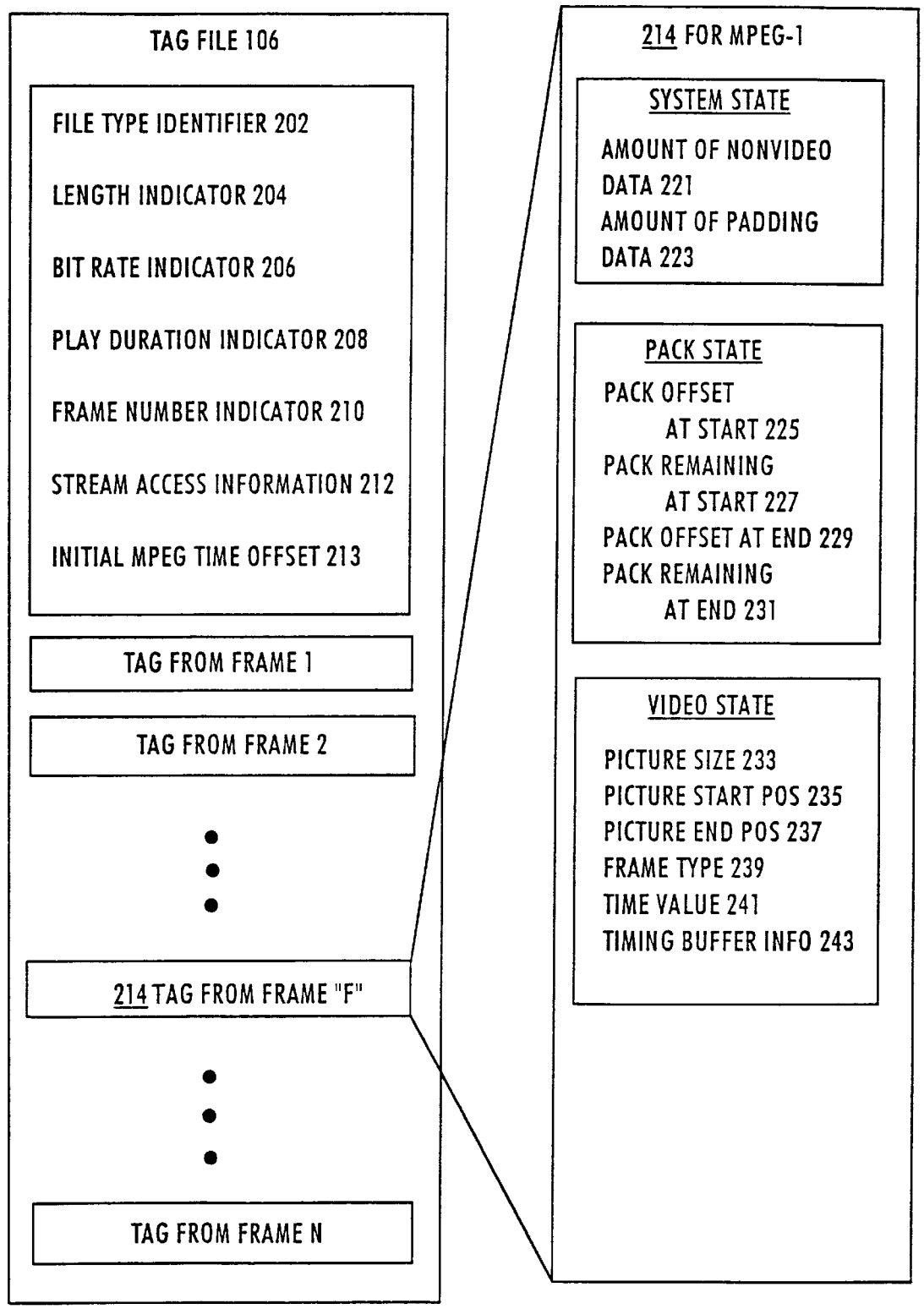
FIG. 2c illustrates the contents of a tag file generated according to an embodiment of the invention.

The tag information generated for each frame in an MPEG-1 file is illustrated in FIG. 2*c*. Referring to FIG. 2*c*. entry 214 includes data indicating the state of three state machines: a system state machine, a pack state machine, and a video state machine. Specifically, tag entry 214 includes the information shown in Table 4.

TABLE 4

| DATA | MEANING |
| --- | --- |
| AMOUNT OF NON-VIDEO DATA 221 | The amount of non-video data (in bytes) contained within the start and end boundaries of the frame data for frame "F". |

TABLE 4-continued

| DATA | MEANING |
| --- | --- |
| AMOUNT OF PADDING DATA 223 | The amount of padding data (in bytes) contained within the start and end boundaries of the frame data for frame "F". |
| PACK OFFSET AT START 225 | The offset between the start boundary of the frame data for frame "F" in the beginning of the pack packet that contains the start boundary for frame "F". |
| PACK REMAINING AT START 227 | The distance between the start boundary for frame "F" and the end of the pack packet that contains the start boundary of frame "F". |
| PACK OFFSET AT END 229 | The offset between the end boundary for frame "F" in the beginning of the packet that contains the end boundary for frame "F". |
| PACK REMAINING AT END 231 | The distance between the end boundary for frame "F" and the end of the pack packet that contains the end boundaiy of frame "F". |
| PICTURE SIZE 233 | The distance (in bytes) between the start boundary for frame "F" and the end boundary for frame "F" . |
| PICTURE START POS 235 | The distance between the start of the MPEG-1 file and the start boundary for frame "F". |
| PICTURE END POS 237 | The position, relative to the beginning of the MPEG-1 file, of the end boundary for frame "F". |
| FRAME TYPE 239 | The technique used to encode the data that represents frame "F". |
| TIME VALUE 241 | The time, relative to the beginning of the movie, when frame "F" would be displayed during a normal playback of MPEG file 104. |
| TIMING BUFFER INFO 243 | Indicates how full the decoder is (sent to the decoder to determine when information should be moved out of the buffer in order to receive newly arriving information). |

As explained above with reference MPEG-1 and MPEG-2 formats, the tag information includes data indicating the state of the relevant stat machines at the beginning of video frames. However, the state machines employed by other digital audio-visual formats differ from those described above just as the state machines employed in the MPEG-1 format differ from those employed in MPEG-2. Consequently, the specific tag information stored for each frame of video will vary based on the digital audio-video format of the file to which it corresponds.

V. SEEK OPERATIONS

Having explained the contents of tag file 106, the use of tag file 106 to perform seek operations shall now be described. When a client wishes to perform a seek operation, the client transmits a seek operation request to stream server 110. The seek operation request may specify, for example, to jump ahead in the MPEG sequence to a position five minutes ahead of the current playing position. In response to the request, stream server 110 inspects the tag file 106 to determine the I-frame (the "target frame") that would be playing in five minutes if the playback operation proceeded at a normal rate. The target frame may be easily determined by inspecting the time value 228 and frame type 232 information stored in tag file 106.

When the target frame is determined, stream server 110 determines the position within the MPEG file 104 of the frame data that corresponds to the target frame (the "target position"). Stream server 110 performs this determination by reading the start position 226 stored in the entry in tag file 106 that corresponds to the target position. Significantly, all of the operations performed by stream server 110 are performed without the need to access MPEG file 104. This allows for the stream server 110 and the video pump 130 to be distributed among the various servers in the server complex.

For the purpose of explanation, various components of system 100 are said to read data from a particular storage medium. For example, tag file generator 112 and video pump 130 are described as reading data from MPEG file 104 located on mass storage device 140, and stream server 110 is described as reading data from tag file 106 stored on mass storage device 140. However, when data is to be frequently accessed, it is typically cached in a faster, temporary storage medium such as dynamic memory. Rather than read the data directly from the slower storage, the components read the data from the faster temporary storage. In the preferred embodiment, at least a portion of the tag file 106 is stored in a cache memory to reduce the number of disk accesses performed by stream server 110.

Once the target position has been determined, the stream server 110 constructs prefix data for the transition. As mentioned above, prefix data is data that must be inserted into the MPEG data stream prior to a transition to ensure that the MPEG data stream remains MPEG compliant. Prefix data shall be described in greater detail below.

Once stream server 110 constructs the prefix data, stream server 110 transmits commands to video pump 130 to instruct video pump 130 to transition from the current position in the MPEG file to the target position. For a seek operation, the commands generated by stream server 110 will typically include an insert command and a play command. The insert command instructs the video pump 130 to cease transmission of MPEG data from the current position, and to transmit the prefix data. This process effectively "inserts" the prefix data into the MPEG data stream. The play command instructs the video pump 130 to begin transmitting data starting at the target position within the MPEG file 104. The video pump 130 inserts this data in a byte-contiguous way such that the client does not see any boundary between the prefix data, the MPEG data, and the suffix data.

Figure 3A:
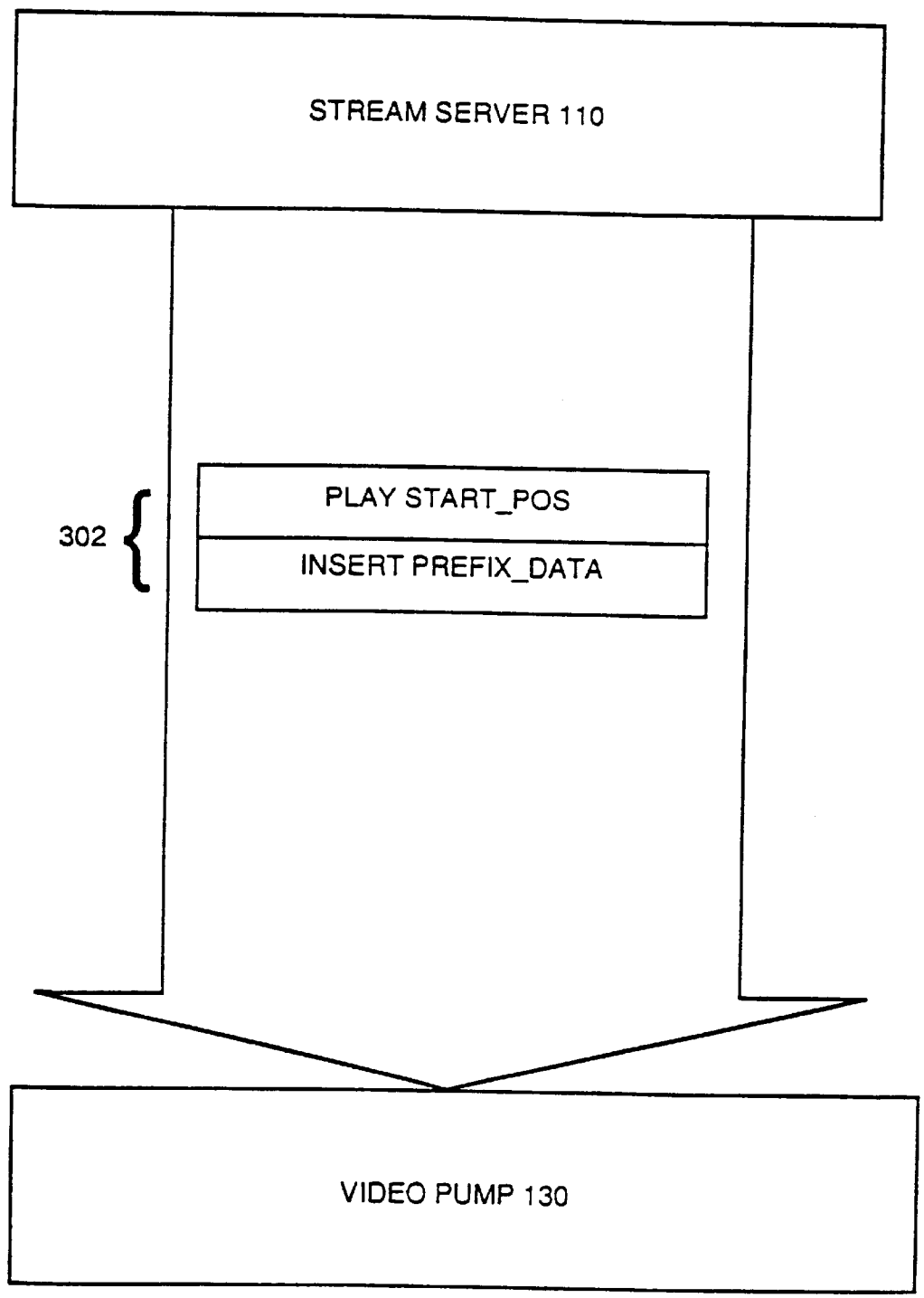
FIG. 3a illustrates the commands sent from the stream server to the video pump in response to a seek request according to an embodiment of the invention.

Referring to FIG. 3a. it illustrates the commands sent by the stream server 110 to the video pump 130 in response to a seek request from a client. In the illustrated example, the stream server 110 transmits two commands 302 to the video pump 130. The first command is an insert command instructing video pump 130 to insert "PREFIX_DATA" into the MPEG data stream that the video pump 130 is sending to a client.

The second command is a play command. The play command instructs the video pump 130 to transmit data beginning at the position "START_POS". START_POS is the position within MPEG file 104 of the first byte of the target frame.

In the preferred embodiment, the "play" instruction supports a "begin position" parameter and an "end position" parameter. In response to a play instruction, the video pump 130 transmits data from the MPEG file beginning at the begin position, and continues to transmit data from the MPEG file until the specified end position is reached. In a seek operation, it is assumed that the playback will continue from the target position to the end of the MPEG file. Therefore, only the begin position parameter of the play command is required for seek operations.

Figure 3B:
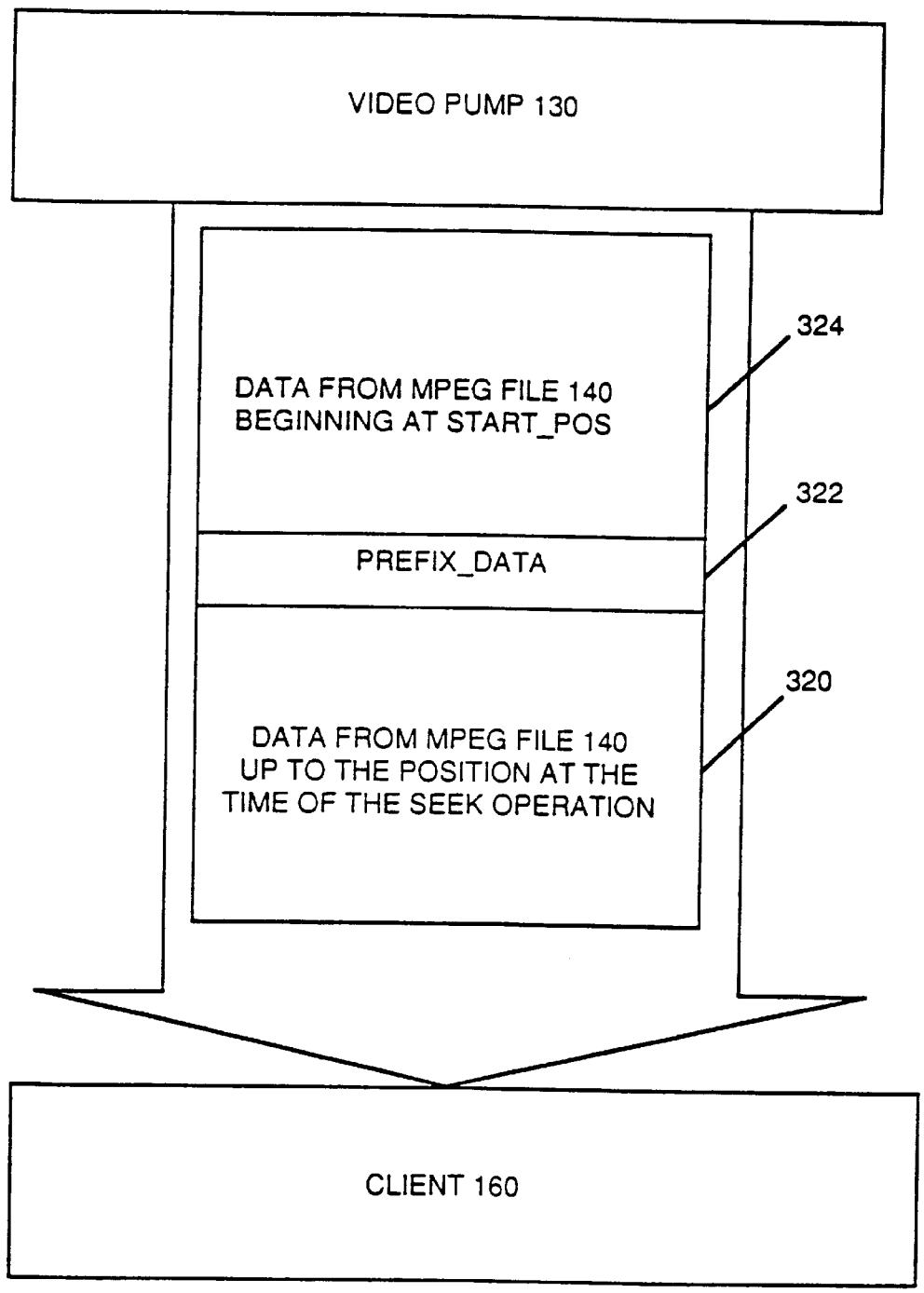

Referring to FIG. 3b. it illustrates the information sent from video pump 130 to a client (e.g. client 160) in response to the "insert" and "play" commands transmitted by stream server 110. At the time that the video pump 130 receives the insert command, the video pump 130 will be sending MPEG data from some position in the MPEG file (the "current position"). Block 320 represents information transmitted by video pump 130 up to the current position. Upon receiving the insert command, the video pump 130 finishes sending the current transport packet, ceases to transmit data from the current position and transmits the prefix data 322. After transmitting the prefix data 322 to the client, the video pump 130 responds to the play command. Specifically, the video pump 130 begins transmission to the client of data 324 beginning at the target location in the MPEG file.

There is no interruption in the MPEG data stream transmitted by video pump 130 to the client during this process. In addition, the MPEG data stream received by the client fully complies to the MPEG standard. Consequently, the MPEG decoder within the client remains completely unaware that a seek operation was performed. Because seek operations performed by the technique discussed above produce an MPEG compliant data stream, custom MPEG decoders are not required.

VI. PREFIX DATA

As mentioned above, MPEG data is packaged in layers. Clients expect the data stream that they receive from video pump 130 to be packaged in those same layers. If video pump 130 simply jumps from one point in the MPEG file 104 to another point, packaging information will be lost and the clients will not be able to properly decode the data. For example, if video pump 130 simply starts transmitting data from point 280 in FIG. 2a. the PES header 248 for PES packet 250 and the header for transport packet 251 will be skipped. These headers contain data which indicates how to decode the information which follows them. Consequently, without the information contained in these headers, the client will not know how to decode the subsequent data.

Therefore, prefix data must be constructed and sent to smoothly transition between the current location in the MPEG file 104 and a new location. The prefix data contains packaging information which begins packages for the data at the new location. In the preferred embodiment, the prefix data includes the information described in Table 5.

TABLE 5

| DATA | MEANING |
| --- | --- |
| DISCARD INFORMATION | For MPEG 2: This is a list of PIDs to keep. All other transport packets are discarded.<br>For MPEG 1: This is a list of elementary streams to keep. |
| SYSTEM & PACK HEADER DATA (MPEG-1 ONLY) | Includes a valid system header and a valid Pack Header. |
| TRANSPORT PACKET HEADER DATA (MPEG-2 ONLY) | Includes private data and MPEG video header data, described below. |
| PRIVATE DATA | Includes a private time stamp and other data described below. |
| VIDEO INITIALIZATION DATA | Includes an MPEG sequence header which indicates frames per second and horizontal and vertical resolutions. |
| POSSIBLE EXTRA PADDING AND SECOND TRANSPORT PACKET HEADER (MPEG-2 ONLY) | Explained below. |

TABLE 5-continued

| DATA | MEANING |
| --- | --- |
| MPEG VIDEO HEADER | MPEG-2: Includes a valid PES header, a video presentation time and, under certain conditions, discontinuity data which causes the client's clock to be reset.<br>MPEG- 1: Contains a valid picture header. |

With respect to the discard information, assume that the target video frame of a seek operation is the video frame located between points 280 and 282 in FIG. 2a. The discard information contained in the insert command generated in response to the seek operation may instruct video pump 130 to discard all of the non-video packets located between points 280 and 282. According to one embodiment, the packets are identified by their PID numbers.

With respect to private data, the mechanism used to convey this data differs between MPEG-1 and MPEG-2. For MPEG-1. private data is sent in a pack packet on the ISO/IEC private data-1 stream. (See section 2.4.4.2 of ISO 11172-1 for more information). For MPEG-2. private data is sent in a packet on the video PID, but in a section of the adaptation field titled private data. (See section 2.4.3.4 of ISO/IEC 13818-1 for more information).

Since may clients may desire specific information about the operation in progress (seek, fast forward, rewind, frame advance or rewind) which cannot be encoded in the file's digital audio-visual storage format, private data is used. When the server knows that "client specific" information is needed, it places it into whatever private data mechanism is supported by the file's audio-visual storage format. Thus, the output to the network maintains its conformance to the required format. This is necessary in case the network is performing checks to be sure that data is not corrupted in transmission. By virtue of being in private data, the "client specific" data will not be checked.

With respect to the possible extra padding, since transport packets have a fixed size in MPEG-2. an extra padding packet is required when the prefix data is too large to fit into the same packet as the first block of video data. For example, assume that point 280 is ten bytes from the beginning of video packet 251. If the prefix data required to transition to point 280 is greater than ten bytes, then the prefix data will not fit in the same packet as the first block of video data. Under such circumstances, the prefix data is sent in a transport packet that is completed with padding. A second transport packet is constructed to transmit the video data located between point 280 and the end of video packet 251. The first ten bytes in this second transport packet are filled with padding.

Since MPEG-1 has variable size packets, this issue for MPEG-1 does not arise. Rather, a correct packet size for the prefix data is simply computed.

VII. PACKET DISCONTINUITIES

In the original MPEG file 104, each packet has an associated time stamp. Typically, the time stamps of packets sequentially located within MPEG file 104 will be sequential. During playback operations, the client tracks the time stamps to determine the integrity of the MPEG data stream. If two sequentially-received packets do not have sequential time stamps, then the client determines that a discontinuity has occurred. If the difference between two sequentially-received time stamps is small, then the client can usually compensate for the discontinuity. However, if the difference between two sequentially-received time stamps is too great, the client may reset itself or initiate some other type of recovery operation.

When a seek operation is performed, the client will sequentially receive packets that are not sequentially located within the MPEG file 104. Because the packets are not sequentially located within MPEG file 104, the time stamps associated with the packets will not be sequential. If the jump specified by the seek operation is relatively large, then the discontinuity between the time stamps may be sufficient to cause the client to terminate normal playback. To avoid this situation, data which causes the client to reset its clock is included in the prefix data. Upon receipt of such data, the client simply resets its clock based on the time stamp contained in the following packet.

As noted above, the time stamps of packets sequentially located within an MPEG file will typically be sequential. However, it is possible to have sequentially stored packets that do not have sequential time stamps. If a large discontinuity occurs between packets in the original MPEG file, then the original MPEG file will itself contain data which causes the client's clock to reset. Stream server 110 inspects the discontinuity flags 230 in tag file 106 to determine whether a particular seek operation will skip any packets which contain data to reset the client's clock. If the seek operation skips over any discontinuous packets, then data that causes the client's clock to reset is added to the prefix data.

Though in concept the same operation is performed in MPEG-1 and MPEG-2. the mechanism by which the operation is performed differs because of the different timing mechanisms used in MPEG-1 and 2. Specifically, in the MPEG-1 embodiment, the "System Clock Reference" (SCR) is the clock used (see Section 2.4.2 of ISO/IEC 11172-1).

In the MPEG-2 embodiment, the "Program Clock Reference" (PCR) and "Presentation Time Stamp" (PTS) are both used. See sections 2.4.2.1 and 2.4.3.6 of ISO/IEC 13818-1 respectively for definitions of the PCR and PTS.

VIII. BUFFER LIMITATIONS

The MPEG decoder in each client has a buffer of a certain limited size. Typically the buffer must be large enough to hold information from two sequential frames of video. Consequently, the data for the later frame of video may be written into the buffer at the same time that the data for the previous frame of video is being read out of the buffer by the decoder.

In many clients, the size of the buffer is selected based on the assumption that the incoming MPEG data stream will never contain two sequentially-ordered large I-frames of video data. During normal playback from an MPEG-compliant file, this assumption will hold true, since P and B-frames will occur between successive I-frames. However, seek operations may cause a jump from a large I-frame located at a first location in the MPEG file 104 to a second I-frame located at a second location in the MPEG file 104. If an attempt is made to write the second I-frame into the buffer before the first I-frame has been entirely read from the buffer, the decoder may lose synchronization or otherwise fail. Stream server 110 detects when a seek operation would cause such an overflow by inspecting the timing buffer information 238 stored in the tag file 106.

To avoid such buffer overflow, the stream server 110 inserts data into the prefix data that will cause the arrival of the second large I-frame to the decoder buffer to be delayed. While the second I-frame is delayed, the client has time to complete the processing of the first I-frame. By the time the data for the second I-frame begins to arrive, the first I-frame has been completely processed so that the portion of the buffer used to hold the previous I-frame is available to hold the second I-frame.

According to one embodiment, the second I-frame is delayed by placing a delayed time stamp in transport packet header portion of the prefix data. The transport packet header portion of the prefix data serves as the header for the packet that contains the beginning of the second I-frame (the "transition packet"). The transition packet is received by a network buffer that feeds the decoder buffer. The network buffer determines when to send the video information contained in the transition packet to the decoder buffer based on the time stamp in the transition packet. Because the time stamp indicates a delay between the transition packet and the previous packet, the network buffer delays the transfer of the video information from the transition packet into the decoder buffer.

According to an alternate embodiment, the second I-frame is delayed by adding padding packets to the prefix data prior to the data that serves as the heading for the transition packet. Such padding packets will arrive at the client prior to the transition packet. As the client receives and discards the padding packets, the first I-frame is being read from the decoder buffer. By the time all of the padding packets have been processed, the first I-frame has been completely read out of the decoder buffer and the decoder buffer is ready to receive the second I-frame.

IX. SPECIFIED-RATE PLAYBACK OPERATIONS

Most video cassette recorders allow viewers to watch analog-based audio-visual works at playback speeds other than normal 1×forward playback. For example, some video cassette recorders provide multiple rates of fast forward, slow forward, slow rewind and fast rewind. The present invention provides similar functionality to the viewers of MPEG-encoded works. In the preferred embodiment, the functionality of typical video cassette recorders is surpassed in that any speed of forward and rewind playback is supported. For example, a viewer could select 1000×fast forward or fast rewind, or 0.0001 slow forward or slow rewind.

In the preferred embodiment, the processes used to implement fast forward, slow forward, slow rewind and fast rewind operations include the same general steps. Therefore, for the purpose of explanation, these steps shall be described with reference to a fast forward operation. After the fast forward process is explained, it shall be described how and when slow motion and rewind operations differ from fast forward operations.

To initiate a fast forward operation, a client transmits a fast forward request to the stream server 110. In embodiments that support more than one fast forward rate, the fast forward request includes data designating a presentation rate. As used herein, "presentation rate" refers to the rate at which the audio-visual work is presented to a viewer.

The stream server 110 receives the fast forward request from the client and, in response to the request, inspects the information contained in tag file 106. Specifically, stream server 110 determines from the information in tag file 106 which frames should be displayed to produce the specified presentation rate. The frame selection process performed by stream server 110 must take into account various constraints that will be described in greater detail below.

X. BIT BUDGETING

The simplest method for selecting frames during a fast forward operation would be to select every Nth frame, where N is the specified presentation rate relative to normal presentation rate. For example, assume that the client requests a 5× fast forward operation. In response to such a request, stream server 110 could select every fifth frame for display. Stream server 110 would then transmit a series of play commands to video pump 130 to cause video pump 130 to transmit an MPEG data stream that contains data for every fifth frame. Thus, the presentation rate would be 5×.

The simple frame selection process described above could work if all of the frames in the MPEG file 104 were encoded in I-frame format and if either all I-frames were the same size or the bandwidth of network 150 was unlimited. However, the bandwidth of network 150 is not unlimited, I-frames do not all have the same size and, as explained above, MPEG files also include frames encoded in P-frame and B-frame formats which cannot be decoded independent of information from other frames.

The bandwidth between video pump 130 and its clients is limited. For example, video pump 130 may be allocated a 1.5 or 2 Megabits per second channel for each MPEG data stream it transmits to a client. To determine whether selection of a particular frame (the "frame at issue") will exceed the available bandwidth, stream server 110 determines the size of the time window that will be available to send the particular frame. The size of the time window is equal to (T2-T1)/PR, where T1 is the time value associated with the previously selected frame, T2 is the time value associated with the frame at issue, and PR is the current presentation rate. For example, assume that the time associated with previously selected frame is one second away from the time of the frame at issue. Assume also that the presentation rate is 10×. Therefore, the time window for sending the frame at issue would be (1 second)/10 or 0.1 seconds.

Once the stream server 110 determines the time window available to send the data for the frame at issue, the stream server 110 determines the current "bit budget" by multiplying the time window by the data transfer rate of the channel through which the MPEG data stream is being sent to the client. For example, if the applicable data transfer rate is 2 Megabits per second and the time window is 0.1 seconds, then the current bit budget is 200K bits. The stream server 110 then reads the frame size from the tag information to determine if the frame at issue falls within the current bit budget. If the size of the frame at issue exceeds the current bit budget, then the frame at issue is not selected. This is the case, for example, if the size of the frame data for the frame at issue is 50K bytes (400K bits) and the bit budget is 200K bits. Otherwise, if the frame at issue falls within the bit budget, then the frame at issue is selected to be sent. If a particular frame is not sent, then it is more likely that a future frame will be sent, because of the unused timespace (and thus bits in the bit budget) of the unused frames.

XI. FRAME-TYPE CONSTRAINTS

As explained above, a frame cannot be accurately recreated from P-frame data unless the preceding I-frame has been decoded. A frame cannot be accurate recreated from B-frame data unless the preceding and succeeding P or I-frame data is decoded. Consequently, stream server 110 is limited with respect to which frames it can select.

Assuming that the bandwidth is available, any I-frame can be selected. According to one embodiment of the invention, only I-frames are even considered for selection. Stream server 110 accesses the tag information to determine the frame type of the frame at issue. If the frame at issue is not an I-frame, then it is automatically skipped, and stream server 110 moves on to evaluate the subsequent frame. At some playback rates, this technique may result in unused bandwidth. That is, the transmission of every I-frame will require less bandwidth than is available. Therefore, stream server 110 transmits insert commands to cause video pump 130 to transmit MPEG padding between the transmission of I-frame information. In the preferred embodiment, the padding packets are sent as one component of suffix data, which shall be described in greater detail below.

According to the preferred embodiment, P and B-frames are not automatically skipped in the frame selection process. Rather, P and B-frames are considered for selection unless information that they require has already been skipped. Specifically, if any I-frame is not selected by stream server 110, then the frames that fall between the skipped I-frame and the subsequent I-frame are skipped. In addition, if any P-frame is not selected, then the B and P-frames that fall between the skipped P-frame and the subsequent I-frame are skipped. Based on these rules, any additional bandwidth available between the transmission of I-frames may be filled with P-frame and B-frame data. As a result, the resulting MPEG data stream will have more frames per second.

According to yet another embodiment, stream server 110 is programmed to skip some I-frames even when the bandwidth is available to send them. For example, stream server 110 may skip every fifth I-frame that otherwise qualifies for selection. Because I-frames are significantly larger than P and B-frames, numerous P and B frames may be sent in the bandwidth made available by skipping a single I-frame. Consequently, the resulting MPEG data stream has more frames per second than it would otherwise have if all qualifying I-frames were selected.

In the preferred embodiment, a client may specify parameters for the selection process performed by stream server 110. For example, the client may request more frames per second. In response, the stream server 110 transmits more P and B frames in the MPEG data stream by increasing the number of qualifying I-frames that it skips. On the other hand, the client may request a more continuous picture. In response, the stream server 110 transmits a higher percentage of qualifying I-frames, leaving less bandwidth for transmitting P and B-frames.

XII. SUFFIX DATA

While the stream server 110 is selecting the frames to be displayed during a fast forward operation, the stream server 110 is simultaneously transmitting commands to the video pump 130 to cause the video pump 130 to send an MPEG video stream containing the frames that have already been selected. The portion of the MPEG data stream used to convey data for a selected frame is referred to herein as a "segment". To maintain compliance with the MPEG standards, segments include prefix data that is sent prior to transmitting the frame data for the selected video frames. The process of generating prefix data was described above with reference to seek operations.

Performing a fast forward operation is similar to performing a series of seek operations in which each seek operation causes the video pump 130 to jump to the data for the next selected frame. Specifically, for each selected frame, the stream server 110 must generate prefix data, transmit an insert command to the video pump 130 to cause the video pump 130 to insert the prefix data into the data stream, and transmit a play command to the video pump 130 to cause the video pump 130 to transmit data from the appropriate frame.

Fast forward operations differ from seek operations in that the play command specifies an end position as well as a beginning position. The end position is the location within the MPEG file 104 of the last byte of the frame data for the selected frame. For example, assume that the frame boundaries for a selected frame F are points 280 and 282 illustrated in FIG. 2a. The stream server 110 would send video pump 130 an insert command to cause video pump 130 to send prefix data to the client, and a play command to cause video pump 130 to send the video data located between points 280 and 282 to the client.

Typically, the end position (e.g. point 282) specified in the play command will not coincide with a packet boundary. Therefore, to maintain MPEG compliance, additional information ("suffix data") must be inserted into the data stream after the transmission of the frame data. The suffix data includes padding which completes the transport packet that contains the end of the selected frame. For example, the suffix data that would be inserted into the data stream after sending the frame F would contain a length of padding equal to the distance between point 282 and the end of video packet 258. Under certain conditions, the suffix data also includes padding packets. As shall be described hereafter, the number of padding packets sent in the suffix data depends on the size of the frame data, the presentation rate, the minimum padding rate and the number of padding packets that were left inside the frame data. Thus, a segment consists of prefix data, the frame data of a selected frame, and suffix data.

Figure 4A:
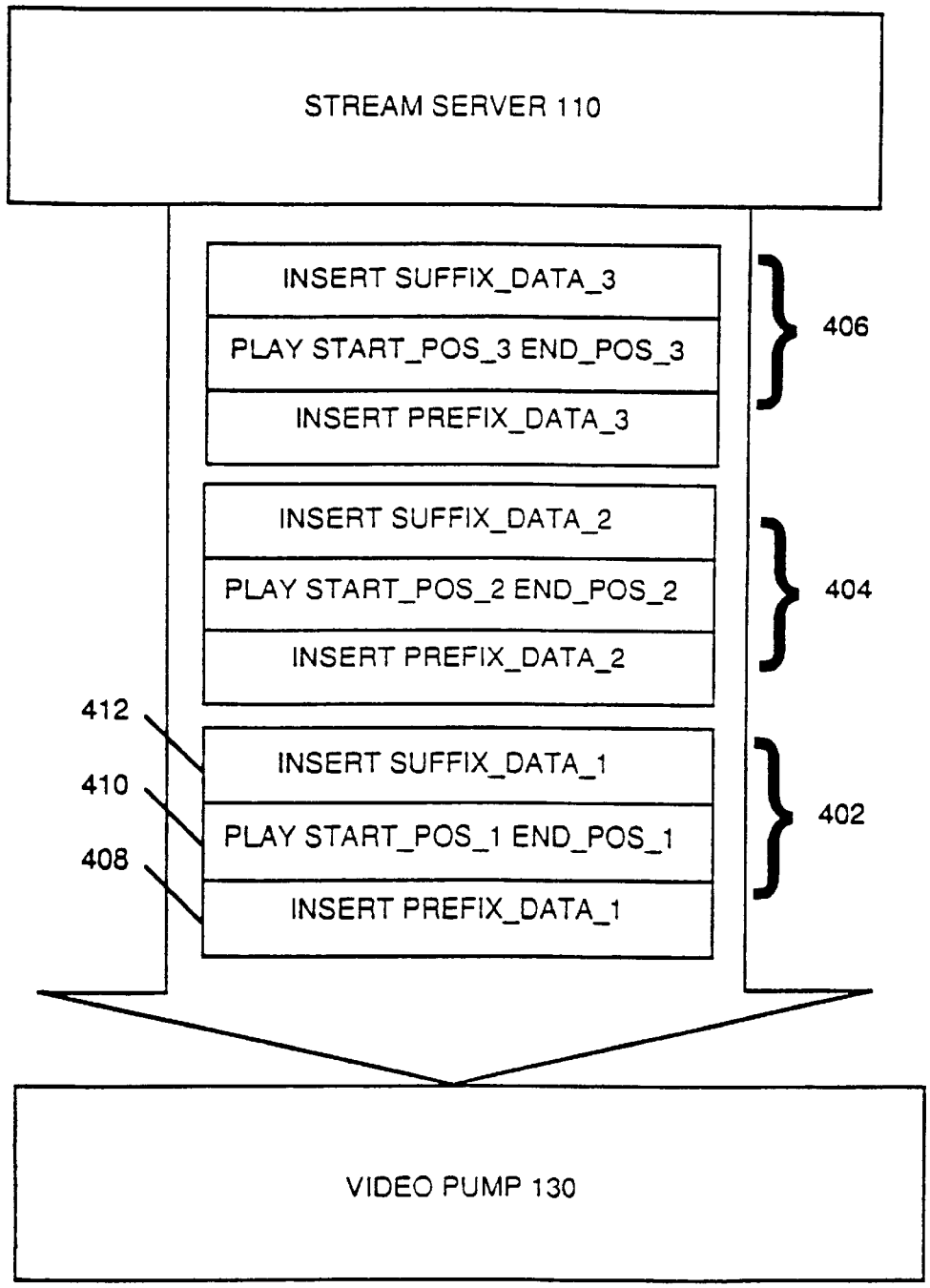
FIG. 4a illustrates the commands sent from the stream server to the video pump during a rate-specified playback operation according to one embodiment of the invention.

The stream server 110 generates the suffix data and transmits an insert command to the video pump 130 to cause the video pump to insert the suffix data into the MPEG data stream. Consequently, during a fast forward operation, the commands sent by the stream server 110 to the video pump 130 appear as illustrated in FIG. 4a Referring to FIG. 4a. stream server 110 has thus far selected three frames to be displayed: frame_1, frame_2 and frame_3. Upon selecting frame_1, stream server 110 transmits three commands 402 to the video pump 130. The three commands 402 include a first insert command 408, a play command 410 and a second insert command 412.

The first insert command 408 instructs video pump 130 to transmit prefix data "PREFIX_DATA_1" to a client. The play command 410 instructs video pump 130 to transmit the data located between the positions START_POS_1 and END_POS_1 to the client. In the illustrated example, START_POS_1 would be the position of the first byte of frame_1, and END_POS_1 would be the position of the last byte of fame_1. The second insert command 412 instructs the video pump 130 to transmit suffix data "SUFFIX_DATA_1" to the client. The data that is specified by these three commands constitutes a segment for frame_1.

As explained above, many transport packets may be required to store the frame data for a single video frame (e.g. frame_1). Other packets that do not contain video information, such as padding packets, timing packets and audio packets, may be interspersed between the video packets for the video frame. In the preferred embodiment, stream server 110 not only transmits the boundaries of each frame to video pump 130, but stream server 110 also indicates what to do with the non-video packets within those boundaries. Typically, the audio packets will be discarded. However, the other non-video packets may or may not be retained based on various factors. For example, to sustain the minimum padding rate stream server 110 may indicate that the padding packets are to be maintained. The value of maintaining a minimum padding rate shall be discussed in greater detail below.

Video pump 130 receives this information from stream server 110 and strips from the MPEG data stream those non-video packets indicated by the stream server 110. Consequently, the information sent by video pump 130 in response to play command 410 will typically include less than all of the data located between START_POS_1 and START_POS_2.

Referring again to FIG. 4a. stream server 110 has transmitted three commands 404 to cause video pump 130 to transmit a segment for frame_2, and three commands 406 to cause video pump 130 to transmit a segment for frame_3. Stream server 110 will continue to transmit commands in this manner to cause video pump 130 to transmit segments for every frame that it selects to be displayed during the fast forward operation.

Figure 4B:
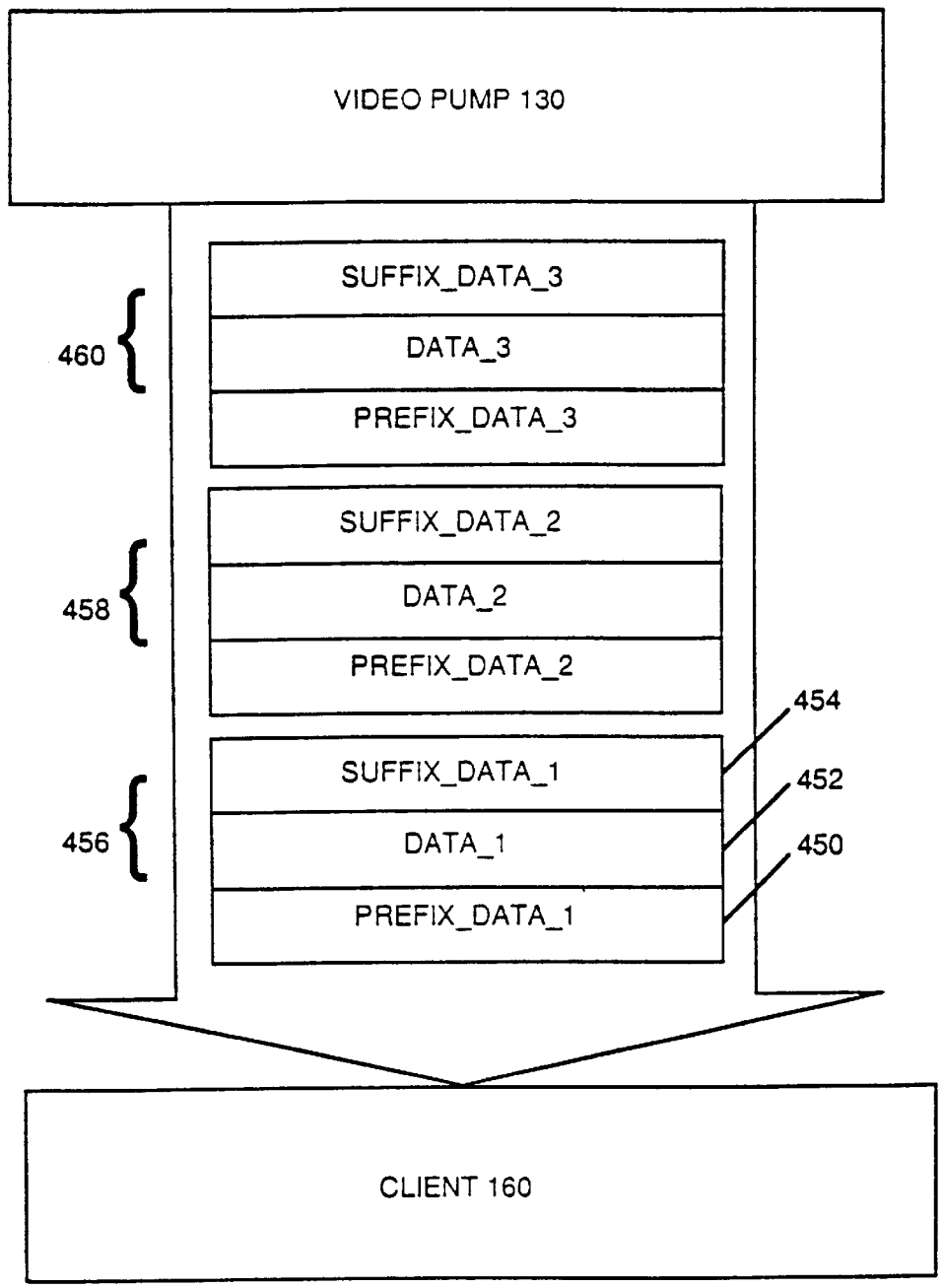

Referring to FIG. 4b. it illustrates the data transmitted by video pump 130 in response to the commands described above. Specifically, in response to the first insert command 408, video pump 130 transmits PREFIX_DATA_1 450 to the client 160. In response to play command 410, video pump 130 transmits the data located between START_POS_1 and END_POS_1. This data, illustrated as DATA_1 452, contains the frame data of frame_1. In response to the second insert command 412, video pump 130 transmits SUFFIX_DATA_1 to the client 160. The segment consisting of PREFIX_DATA_1, DATA_1 and SUFFIX_DATA_1 conveys the frame data of frame_1 to client 160 while maintaining compliance with the MPEG standards.

In the preferred embodiment, these commands between the stream server 110 and video pump 130 are sent over a very fast lightweight network or through shared memory. For a typical stream, supporting 15 frames-per second of fast forward, 45 commands per second shall be sent thus stressing communications inside the server. In the preferred embodiment, the commands are sent from the stream server 110 to the video pump 130 in batches.

XIII. SLOW MOTION OPERATIONS

As explained above, frames are selectively skipped for playback operations that exceed normal playback speed. For playback operations that are slower than normal playback speed, no frames are skipped. Rather, stream server 110 selects every frame. As in fast forward operations, the video pump 130 transmits segments for each of the selected frames in response to commands generated by stream server 110. The suffix data in the segments include padding packets which delay the arrival of the subsequent segments. Consequently, the frame data arrives and is decoded at a slower rate than during normal playback operations. Alternatively, the time delays may be imposed by causing the stream server 110 to insert delayed time stamps into the prefix data that it sends to the video pump 130.

XIV. REWIND OPERATIONS

Rewind operations are performed in the same manner as fast and slow forward operations with the exception that only I-frames are selected for rewind operations (regardless of whether the rewind operations are fast or slow). P and B frames are automatically skipped because they cannot be decoded unless frames that precede them in the original MPEG file are processed before them. However, during rewind operations, the frames on which P and B frames depend will be processed after the P and B frames that depend on them.

The concept of "multistream" fast forward or rewind has been mentioned above. Multistream fast forward or rewind is accomplished by storing multiple copies of the movie, where the copies have been recorded at various rates.

In the preferred embodiment, when a client requests a certain fast forward or rewind presentation rate, the stream server 110 will determine whether it has a prerecorded file at that rate. If so, it will play that file. This will give the user more frames per second and will also cause less computational and communication load on the stream server 110 and video pump 130. However, if the requested rate is not available, the stream server 110 will determine the best file from which to choose individual frames, and will process that file as described above. The best file will be the file which has the most I-frames to select from at the requested presentation rate.

This integration of "multi-stream" and "single-stream" fast forward and rewind thus allows servers to choose between any level of quality, disk storage requirements, and server computational and communication load, providing significant advantage over the use of multi-stream operations alone.

XV. RUNTIME COMMUNICATION

In the preferred embodiment, stream server 110 is configured to receive and transmit responses to queries made by clients while video pump 130 is transmitting an MPEG data stream to the clients. The stream server 110 conveys the responses to the queries to the client by causing video pump 130 to insert the responses into the MPEG data stream that is being sent to the client. This process is complicated by the fact that the communication channel between video pump 130 and each client is completely filled by the MPEG data stream that the video pump 130 is sending.

However, some packets in the MPEG data stream are merely padding, and do not contribute to the resulting audio-visual display. To take advantage of the bandwidth occupied by these padding packets, the stream server 110 causes video pump 130 to replace these padding packets with data packets that contain responses to the queries. When the data packets arrive at the client, the MPEG decoder in the client determines that the data packets do not contain audio-visual data and passes the data packets to a higher level application. The higher level application inspects the data packets and extracts from the data packets any information contained therein.

During fast forward and fast rewind operations, the ability of the stream server 110 to communicate with the client in this manner would be lost if the frame selection process did not leave room for padding packets that may be replaced with data packets. Therefore, in one embodiment of the invention, the stream server 110 selects frames in such a way as to ensure some available minimum padding rate. If selection of a frame would cause the padding rate to fall below the specified minimum rate, then the frame is skipped. The stream server 110 also tells the video pump 130 where to put the requisite padding.

According to one embodiment, the video pump 130 does not replace padding packets with data packets, but actually generates the padding packets. The MPEG data stream transmitted by the video pump 130 passes through a downstream manager 131 prior to arriving at the client. The downstream manager replaces the padding packets with data packets that contain the responses generated by stream server 110. Because the MPEG data stream maintains a minimum level of padding, the downstream manager is guaranteed a minimum bandwidth for placing data packets into the MPEG data stream.

XVI. FRAME ACCURATE POSITIONING

For many uses, it is important to be able to determine exactly which frame is being displayed by the client at any given time. For example, a user may wish to pause the playback of an MPEG movie, select an item on the screen, and select a menu option that places an order for the item over the network. If the currently displayed frame is not accurately identified, then the wrong item may be ordered.

During normal movie play, frame accurate positioning is encoded as part of the normal MPEG data stream. Specifically, time stamps are interleaved with the frame data in the MPEG data stream. Hardware in the client extracts this timing information. Typically, numerous frames follow each time stamp. Therefore, the client uniquely identifies the currently displayed frame based on the last timing information and the number of frames that have been processed since receipt of the last timing information.

During fast forward and fast rewind, the identity of frames cannot be determined by the timing information contained in the MPEG data stream. For example, the third frame after a particular time stamp may be one of any number of frames depending on the current playback rate and frame selection technique. Consequently, to provide frame accurate positioning, the stream server 110 is configured to insert a time stamp in front of every frame transmitted in the MPEG data stream. Video pump 130 receives the time stamp information from the stream server 110, which retrieves the time stamp from the tag file 106.

Many clients are not able to decode more than a certain number of time stamps per second because the MPEG specification does not require them to decode more than a certain amount of time stamps per second. Therefore, in the preferred embodiment, the time stamp inserted before each frame is not an MPEG time stamp. Rather, the time stamps are placed in packets that are tagged as MPEG "private data packets". When a client receives a private data packet, it determines whether it recognizes the data in the packet. Clients that do not support private data time stamps simply discard the private data packets containing the time stamps and thus will not be able to do perfect frame accurate positioning. Such clients will still be able to perform approximate frame positioning based on the MPEG time stamps that are coincidentally included in the MPEG data stream. Clients that support private data time stamps extract the time stamps from the private data packets and thus can exactly determine the identity of the frames that follow the time stamps.

XVII. DISK ACCESS CONSTRAINTS

Figure 7:
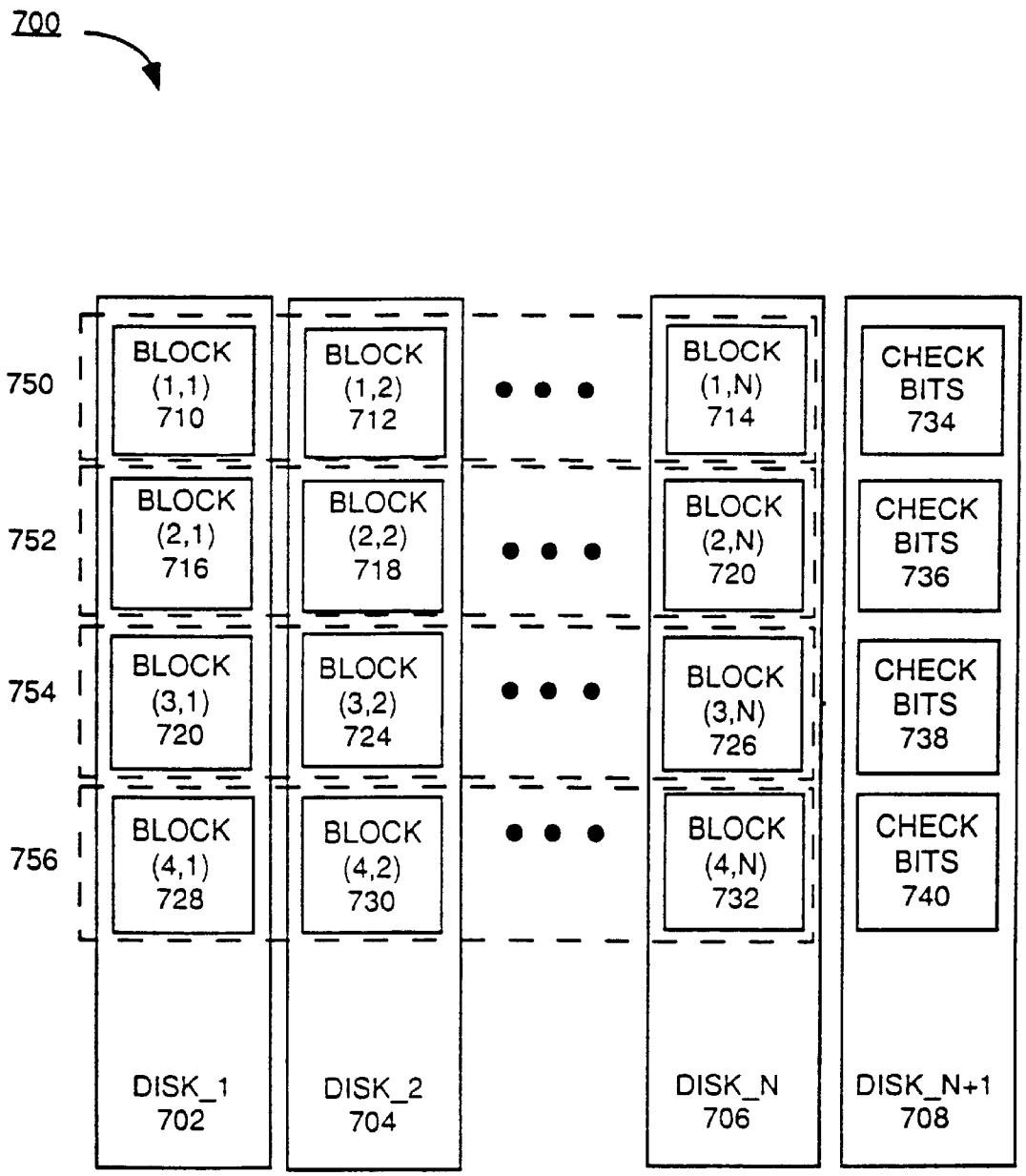
FIG. 7 is a block diagram illustrating a multi-disk MPEG playback system according to an embodiment of the invention.

In some video playback systems, a single MPEG file may be stored across numerous disk drives to increase the fault tolerance of the system. Consider, for example, the multi-disk system 700 illustrated in FIG. 7. System 700 includes N+1 disk drives. An MPEG file is stored on N of the N+1 disks. The MPEG file is divided into sections 750, 752, 754 and 756. Each section is divided into N blocks, where N is the number of disks that will be used to store the MPEG file. Each disk stores one block from a given section.

In the illustrated example, the first section 750 of the MPEG file includes blocks 710, 712 and 714 stored on disks 702, 704 and 706, respectively. The second section 752 includes blocks 716, 718 and 720 stored on disks 702, 704 and 706, respectively. The third section 754 includes blocks 722, 724 and 726 stored on disks 702, 704 and 706, respectively. The fourth section 756 includes blocks 728, 730 and 732 stored on disks 702, 704 and 706, respectively.

The disk 708 which is not used to store the MPEG file is used to store check bits. Each set of check bits corresponds to a section of the MPEG file and is constructed based on the various blocks that belong to the corresponding section. For example, check bits 734 corresponds to section 750 and is generated by performing an exclusive OR operation on all of the blocks in the first section 750. Similarly, check bits 736, 738 and 740 are the products of an exclusive OR performed on all of the blocks in the section 752, 754 and 756, respectively.

System 700 has a higher fault tolerance than a single disk system in that if any disk in the system ceases to operate correctly, the contents of the bad disk can be reconstructed based on the contents of the remaining disks. For example, if disk 704 ceases to function, the contents of block 712 can be reconstructed based on the remaining blocks in section 750 and the check bits 734 associated with section 750. Similarly, block 718 can be constructed based on the remaining blocks in section 752 and the check bits 736 associated with section 752. This error detection and correction technique is generally known as "Redundant Array of Inexpensive Disks" or RAID.

During real-time playback using RAID, a video pump reads and processes the MPEG file on a section by section basis so that all of the information is available to reconstruct any faulty data read from disk. During normal playback operations, there is sufficient time to perform the disk accesses required to read an entire section while the data from the previous section is being transmitted in the MPEG data stream. However, during fast forward and fast rewind operations, less than all of the data in any section will be sent in the MPEG data stream. Because less data is sent, the transmission of the data will take less time. Consequently, less time will be available to read and process the subsequent section.

For example, assume that only one frame X from section 750 was selected for display during a fast forward operation. During the time it takes to transmit the segment for frame X, the data for the next selected frame Y must be read and processed. Assume that the next frame Y is located in section 752. If the MPEG file is read and processed on a section by section basis (required for RAID), then all of the blocks in section 752 must be read and processed during the transmission of the single frame X. Even if it were possible to read and process all of the blocks in section 752 in the allotted time, it may still be undesirable to do so because of the resources that would be consumed in performing the requisite disk accesses.

In light of the foregoing, video pump 130 does not use RAID during fast forward and fast rewind operations. Rather, video pump 130 reads, processes and transmits only the data indicated in the commands it receives from the stream server 110. Thus, in the example given above, only the frame data for frame Y would be read and processed during the transmission of the segment for frame X. By bypassing RAID during fast forward and fast rewind operations, disk bandwidth remains at the same level or below that used during normal playback operations.

Since RAID is not used during real-time fast forward and fast rewind operations, faulty data cannot be reconstructed during these operations. Consequently, when the video pump 130 detects that the data for a selected frame is corrupted or unavailable, the video pump 130 discards the entire segment associated with the problem frame. Thus, if the data associated with a frame cannot be sent, then the prefix and suffix data for the frame is not sent either. However, any padding packets that were to be sent along with the prefix or suffix data will still be sent.

By sending data in entire "segments", conformance with the digital audio-visual format is maintained. In one embodiment, the video pump 130 will send down padding packets to fill the line to maintain the correct presentation rate. In the preferred embodiment, this behavior is selectable by the client.

XVIII. VARIABLE RATE PLAYBACK OPERATIONS

As mentioned above, a client may change the presentation rate of the audio-visual work by transmitting a rate change request to the stream server 110. Typically, clients issue change rate requests in response to input received from a user. For example, a user may press a fast forward button on a remote control. The remote control transmits a signal that identifies the button that was pressed. The client receives and decodes the signal transmitted by the remote control to determine that the fast forward button was requested. The client then transmits a change rate request to the stream server 110 that specifies some presentation rate greater than 1×.

According to one embodiment of the invention, the client is configured to detect if the user continues to hold down the fast forward button. If the user holds down the fast forward button for more than a predetermined interval, then the client transmits a second change rate request that designates a faster presentation rate than the previously requested presentation rate. While the user continues to hold down the fast forward button, the presentation rate is continuously increased. Another button, such as the rewind button, may be pressed to incrementally decrease the presentation rate.

The process described above appears to the user as a variable rate fast forward operation. However, to the stream server 110, the operation actually consists of a series of distinct fast forward operations. This incremental rate adjustment process has been described with reference to fast forward operations. However, it may equally be applied to slow forward, slow rewind and fast rewind operations. Further, rate changes may be performed in response to the how many times a particular button is pressed rather than or in addition to how long the button is pressed. In addition, a visual indication of the current presentation rate, such as an arrow that has a length that reflects the presentation rate, may be displayed on the screen while the presentation rate does not equal 1×.

XIX. NON-INTERACTIVE DIGITAL AUDIO-VISUAL EDITING

By initiating seek operations and rate-specified playback operations, a user is effectively performing interactive MPEG editing. That is, the MPEG data stream that is produced in response to these operations is based on but differs from the content of the original MPEG file. In addition to such interactive presentation of content, the present invention provides a mechanism for non-interactive MPEG editing. During non-interactive MPEG editing, an MPEG file is produced which is based on but differs from one or more pre-existing MPEG files. The mechanism for non-interactive MPEG editing shall now be described with reference to FIGS. 5 and 6.

Figure 5:
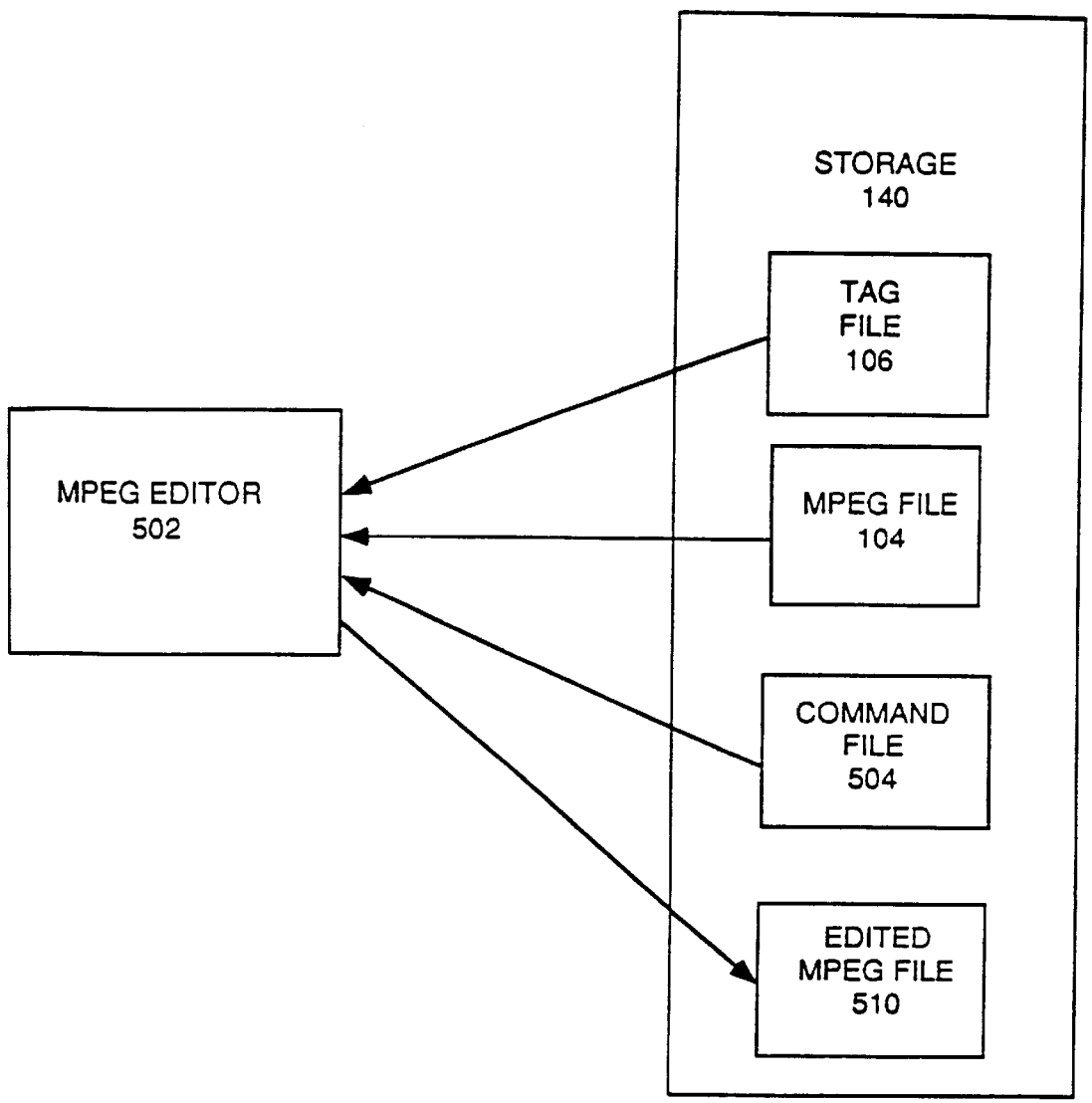
FIG. 5 illustrates an MPEG editor configured to perform non-interactive MPEG editing according to an embodiment of the invention.

Referring to FIG. 5, an MPEG editor 502 is provided for generating new MPEG sequences based on pre-existing MPEG content. According to one embodiment, the MPEG editor 502 reads a command file 504 containing editing commands. The commands contained in the command file 504 include parameters for specifying "splices" from pre-existing MPEG files. For example, each of the commands in command file 504 may have the following format:

"filename" [start_pos] [end_pos] [presentation_rate]

In this exemplary command, the "filename" parameter represents a pre-existing MPEG file. The remaining parameters specify a splice from the specified MPEG file. Specifically, the start_pos parameter represents the position within the specified MPEG file at which to begin the splice. If no start_pos is designated, it may be assumed that the splice is to begin at the first frame of the specified MPEG file. The end_pos parameter represents the position at which to end the splice. If no end_pos is designated, it may be assumed that the splice is to end at the end of the specified MPEG file. The presentation_rate represents the presentation rate of the splice relative to the original MPEG file. If no presentation rate is specified, then a normal (i.e. 1×) presentation rate is assumed.

In the preferred embodiment, the start_pos and end_pos parameters are specified in terms of time because timing information is typically more accessible to a user than file position information. For example, a user may want to specify a two minute splice that begins ten minutes into a particular MPEG movie and ends twelve minutes into the MPEG movie. The user typically will not know the file position of the first byte in the frame that is displayed ten minutes into the movie, or the last byte in the frame that is displayed twelve minutes into the movie. As shall be explained hereafter, the MPEG editor 502 determines file positions that correspond to the specified times by inspecting the tag information for the specified MPEG file.

Figure 6:
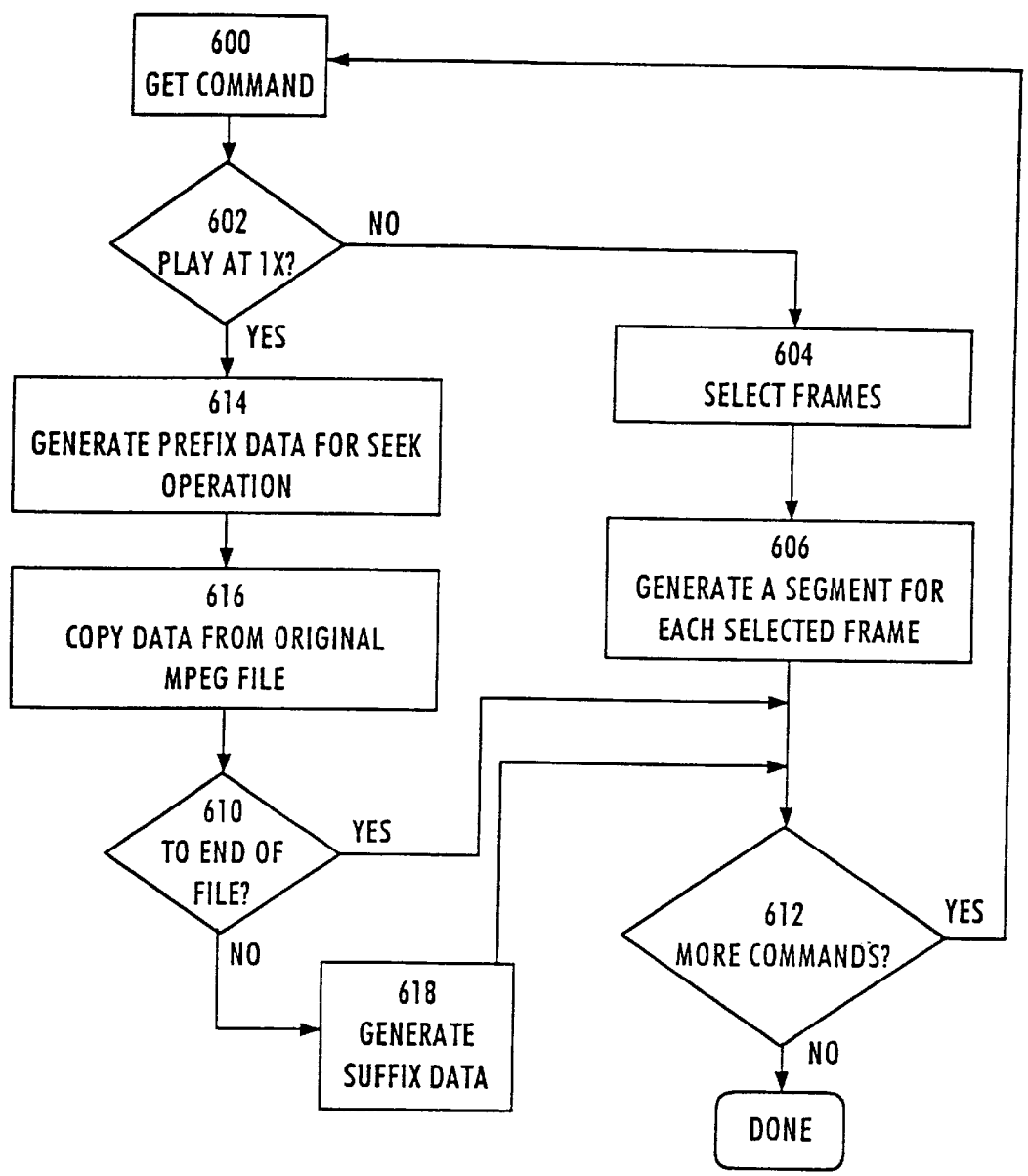
FIG. 6 is a flow chart illustrating the operation of the MPEG editor of FIG. 5 according to an embodiment of the invention.

The operation of MPEG editor 502 shall now be described with reference to FIG. 6. At step 600, the MPEG editor 502 reads a command in the command file 504. Preferably the commands are read in the same sequence as they appear in the command file 504. Therefore, MPEG editor 502 will read the first command in command file 504 the first time that step 600 is performed.

At step 602, the MPEG editor 502 determines whether the command specified a 1× presentation rate. If a presentation rate other than 1× was specified, then control passes to step 604. Steps 604 and 606 are analogous to the steps performed by stream server 110 and video pump 130 during a specified-rate playback operation. Specifically, at step 604 MPEG editor 502 selects frames in the specified MPEG file that fall within the specified time period (start_pos to end_pos). Frames are selected based on the specified presentation rate and the tag information according to the selection process described in detail above. Once the frames are selected, segments are generated (step 606) which package the frame data corresponding to the selected frames in MPEG-compliant packets. These segments are stored in sequence to produce a portion of an edited MPEG file 510. Control then passes to step 612, which either causes the next command to be processed or the editing operation to end if there are no more commands to be processed.

If a 1× presentation rate was specified, then control passes from step 602 to step 614. At steps 614 and 616, MPEG editor 502 performs an operation analogous to the seek operation described above. Specifically, MPEG editor 502 compares the specified starting position with the time stamp information contained in the tag file 106 to determine the position of a target frame. MPEG editor 502 then generates prefix data (step 614) to perform the transition to the specified frame. After generating the prefix data, MPEG editor 502 copies data from the specified MPEG file into the edited MPEG file 510 beginning at the start of the target frame (step 616).

Once the data between start_pos and end_pos has been copied into edited MPEG file 510, MPEG editor 502 determines whether the splice terminated at the end of the specified MPEG file (step 610). If the splice terminated at the end of the specified MPEG file, then the splice ended on a packet boundary. Otherwise, suffix data is generated (step 618) to complete the current packet (step 618). Control then passes to step 612, which either causes the next command to be processed or the editing operation to end if there are no more commands to be processed.

When all of the commands in the command file 504 have been processed by MPEG editor 502, the edited MPEG file 510 will be an MPEG compliant file containing the splices specified by the commands in the command file 504. Significantly, the edited MPEG file 510 was generated without having to perform additional analog-to-MPEG encoding. Further, editing may be performed even if one does not have access to any of the analog versions of the original works. By generating MPEG files in this manner, a user may quickly create unique and original movies based on preexisting MPEG content.

Typically, non-interactive MPEG editing does not have to be performed in real-time. Therefore, some of the time constraints that apply to real-time operations do not apply to non-interactive MPEG editing. For example, it was explained above that due to timing constraints RAID error correction techniques are not used during fast forward and fast rewind operation. Since such timing constraints do not apply to non-interactive MPEG editing, RAID is used during the fast forward and fast rewind operations performed to produce edited MPEG file 510.

For the purpose of explanation, the various data repositories used in the editing process are illustrated as files stored on storage device 140. However, this form and location of this data may vary from implementation to implementation. For example, the various files may be stored on separate storage devices. Further, a user interface may be provided which allows a user to operate graphical controls to specify the parameters for a series of splices.

XX. DISTRIBUTED SYSTEM

As explained above, the tasks performed during the real-time transmission of MPEG data streams are distributed between the stream server 110 and the video pump 130. The distributed nature of this architecture is enhanced by the fact that the video pump 130 does not require access to tag file 106, and stream server 110 does not require access to MPEG file 104. Consequently, stream server 110 and video pump 130 may operate in different parts of the network without adversely affecting the efficiency of the system 100.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for playing at a second presentation rate an audio-visual work that has been digitally encoded in a digital data stream for playback at a first presentation rate, wherein said digital data stream includes a sequence of video frame data, each video frame data in said sequence of video frame data corresponding to a video frame in said audio-visual work, the method comprising the computer-implemented steps of:

selecting a selected set of video frames from said audio-visual work based on said second presentation rate and sizes of video frame data that correspond to said video frames;

constructing a second digital data stream that includes the video frame data that corresponds to each video frame of said selected set of video frames; and transmitting said second digital data stream to a decoder.

2. The method of claim 1 wherein said step of selecting said selected set of video frames includes repeatedly performing the steps of:

determining a bit budget based on a first time value associated with a most recently selected video frame, a second time value associated with a current frame, said second presentation rate and a data transfer rate;

determining a size of the frame data that corresponds to the current frame;

if the size of the frame data that corresponds to the current frame exceeds said bit budget, then not selecting said current frame as a video frame in said selected set of video frames, and selecting a new frame as a new current frame; and if the size of the frame data that corresponds to the current frame does not exceed said bit budget, then selecting said current frame as a video frame in said selected set of video frames.

3. The method of claim 1 wherein said sequence of video frame data includes video frame data from which said corresponding video frame can be constructed without reference to any other video frame data, and video frame data from which said corresponding video frame cannot be constructed without reference to any other video frame data, said step of selecting a selected set of video frames including not selecting for said selected set any video frame that corresponds to video frame data from which said corresponding video frame can be constructed without reference to any other video frame data.

4. The method of claim 1 wherein said sequence of video frame data includes video frame data from which said corresponding video frame can be constructed without reference to any other video frame data, and video frame data from which said corresponding video frame cannot be constructed without reference to any other video frame data, said step of selecting a selected set of video frames including selecting for said selected set video frames that correspond to video frame data from which said corresponding video frame cannot be constructed without reference to any other video frame data if and only if the video frames that correspond to said other video frame data have also been selected for said selected set of video frames.

5. The method of claim 1 wherein said step of constructing said second digital data stream includes causing said second digital data stream to conform to a predetermined format by inserting prefix data into said second digital data stream prior to each video frame data, and inserting suffix data into said second digital data stream after each video frame data.

6. The method of claim 1 wherein said steps of selecting is performed by a stream server running on a first computer and said steps of constructing and transmitting are performed by a video pump running on a second computer, the method further comprising the step of said stream server transmitting to said video pump a sequence of instructions that indicate how said video pump is to construct said second digital data stream.

7. The method of claim 1 further comprising the steps of:

parsing the digital data stream to generate tag information, said tag information including for each frame represented in said digital data stream:

a location within said digital data stream of the frame data that represents said frame, a size of the frame data that represents said frame, and a time value that indicates when said frame is to be displayed during a performance of said audio-visual work at said first presentation rate; and selecting said selected set of video frames based on said tag information.

8. The method of claim 7 wherein said digital data stream is divided into a plurality of packets, said step of parsing including the step of generating in said tag information, for each frame represented in said digital data stream, data indicating an offset between a starting boundary of the frame data for said frame and a start of the packet of said plurality of packets in which said starting boundary resides.

9. The method of claim 5 wherein one or more non-video packets are contained within a start boundary and an end boundary of frame data for a given frame in said selected set of video frames, the method further comprising the step of removing at least one of said one or more non-video packets from said frame data for said given frame prior to transmitting said frame data for said given frame in said second digital data stream.

10. The method of claim 1 further comprising the steps of:

transmitting said digital data stream to said decoder prior to receiving a rate change request from a user;

receiving said rate change request from said user; and in response to said rate change request from said user, ceasing to transmit said digital data stream to said decoder, and performing said steps of selecting said selected set of video frames on a frame-by-frame basis, constructing said second digital data stream, and transmitting said second digital data stream to said decoder.

11. The method of claim 10 wherein said step of transmitting said digital data stream includes reading said digital data stream from a plurality of storage devices using redundant array of inexpensive disks (RAID) error correction, and said step of transmitting said second digital data stream includes reading frame data for said selected set of video frames from said plurality of storage devices without using RAID error correction.

12. The method of claim 1 further comprising the steps of:

selecting a selected data stream from a plurality of digital data streams, each of said plurality of digital data streams representing said audio-visual work at a different presentation rate;

if said selected data stream represents said audio-visual work at said presentation rate, then transmitting data from said selected data stream without performing said steps of selecting a selected set of video frames and constructing said second digital data stream;

If said selected data stream does not represent said audio-visual work at said second presentation rate, then selecting said selected set of video frames from frames represented in said selected data stream and;

constructing said second digital data stream to include frame data from said selected data stream.

13. The method of claim 12 wherein:
said plurality of digital data streams include a plurality of frame types including a first frame type that contains all of the information required to reconstruct a frame; and
said step of selecting said selected data stream is performed based on how many of said video frames in said selected set of video frames would have said first frame type.

14. A method for playing at a slower presentation rate an audio-visual work that has been digitally encoded in a digital data stream for playback at a first presentation rate, wherein said digital data stream includes a sequence of video frame data, each video frame data in said sequence of video frame data corresponding to a video frame in said audio-visual work, the method comprising the computer-implemented steps of:
constructing from video frame data retrieved from said digital data stream a second digital data stream which is digitally encoded for playing said audio-visual work at said slower presentation rate; and
transmitting said second digital data stream to a decoder;
wherein said steps of constructing and transmitting are performed in parallel.

15. The method of claim 14 wherein said step of constructing said second digital data stream includes inserting delay data into said second digital data stream, said delay data causing more time to elapse between decoding successive video frames represented in said second digital data stream than elapses between decoding successive video frames in said digital data stream.

16. The method of claim 15 wherein said step of inserting delay data includes inserting padding data into said second digital data stream between frame data that corresponds to successive video frames.

17. The method of claim 15 wherein said step of inserting delay data includes inserting decode time stamps into said second digital data stream that indicate when corresponding video frames represented in said second digital data stream are to be decoded.

18. A method of preprocessing an original digital data stream that represents an audio-visual work to create tag information, the audio-visual work including a sequence of frames, the original digital data stream including a sequence of frame data, each frame data corresponding to a frame in said sequence of frames, the method comprising the steps of:
for each frame in said sequence of frames, performing the steps of
determining boundaries within said original digital data stream for the frame data corresponding to said frame;
generating tag data that includes boundary data that indicates said boundaries of said frame data; and
storing said tag data separate from said original digital data stream.

19. The method of claim 18 further comprising the steps of:
generating a second digital data stream based on said original digital data stream;
when said second digital data stream reflects data at a first location in said original digital data stream, performing the steps of
receiving a skip control signal that indicates a second location in said original digital data stream;
reading said tag data to determine a boundary of a frame that corresponds to said second location;
causing said second digital data stream to reflect data beginning at the boundary of the frame that corresponds to said second location.

20. The method of claim 19 wherein said skip control signal indicates said second location by specifying an amount of time, said second location being the location of data that would be reflected in said second digital data stream after said amount of time had elapsed during a normal speed, sequential playback operation.

21. The method of claim 18 wherein said sequence of frame data includes multiple types of frame data, the method further comprising, for each frame in said sequence of frames, performing the step of generating frame type data that indicates a frame type for the frame data corresponding to said frame.

22. A method for selecting frames for display during a performance at a specified presentation rate of a work represented in a digital video file, wherein the performance is produced by decoding a data stream generated from the digital video file over a channel having a predetermined data transfer rate, the method comprising:
selecting for display a first frame represented by frame data in said digital video file, said first frame being associated with a first time;
inspecting a second frame that is represented by frame data in said digital video file, said second frame being associated with a second time;
determining a bit budget based on said presentation rate, a time difference between said first time and said second time and said predetermined data transfer rate;
comparing the bit budget to the size of the frame data that represents said second frame;
if the size of the frame data exceeds the bit budget, then skipping the second frame; and
if the size of the frame data is less than the bit budget, then selecting the second frame for display.

23. The method of claim 22 further comprising the steps of:
determining a frame type of said second frame; and
skipping said second frame if said frame type does not correspond to an encoding technique that preserves all of the information required to reproduce said frame.

24. The method of claim 22 wherein said digital video file is an MPEG-1 or MPEG-2 file which includes I-frames, P-frames and B-frames, the method further comprising the steps of:
determining whether said second frame is an I-frame, a P-frame or a B-frame;
if said second frame is a P-frame, then skipping said second frame if any I-frames or P-frames located between said first frame and said second frame have been skipped; and
if said second frame is a B-frame, then skipping said second frame if any I-frames or P-frames located between said first frame and said second frame have been skipped.

25. A method for creating a second digital video stream from one or more other digital video streams, the method comprising the computer-implemented steps of:
receiving a series of editing commands, each editing command in said series of editing commands specifying a start position, an end position, and a presentation rate;
for each editing command in said series of editing commands, performing the steps of
selecting a selected set of video frames between said start position and said end position in said one or more other digital video streams based on said presentation rate; and
storing frame data corresponding to said selected set of video frames in said second digital video stream.

* * * * *